United States Patent [19]
Basehore et al.

[11] Patent Number: 5,673,365
[45] Date of Patent: Sep. 30, 1997

[54] FUZZY MICROCONTROLLER FOR COMPLEX NONLINEAR SIGNAL RECOGNITION

[75] Inventors: Paul Basehore, Sanford; Mike Ziemacki, Debay, both of Fla.

[73] Assignee: Microchip Technology Incorporated, Chandler, Ariz.

[21] Appl. No.: 408,807

[22] Filed: Mar. 23, 1995

Related U.S. Application Data

[63] Continuation-in-part of Ser. No. 41,235, Mar. 31, 1993, Pat. No. 5,412,752, which is a continuation-in-part of Ser. No. 893,093, Jun. 3, 1992, Pat. No. 5,459,816, which is a continuation-in-part of Ser. No. 712,871, Jun. 12, 1991, Pat. No. 5,245,695.

[51] Int. Cl.$^6$ .................................................. G06G 7/00
[52] U.S. Cl. ........................... 395/3; 395/51; 395/61; 395/900; 395/905; 364/424.01; 180/282; 280/735
[58] Field of Search .................. 364/424.01, 424.05, 364/424.1, 426.01, 426.04; 180/422, 282, 268, 274; 280/728.2, 735, 737; 395/900, 905, 3, 51, 61

[56] References Cited

U.S. PATENT DOCUMENTS

| | | |
|---|---|---|
| 5,012,430 | 4/1991 | Sakurai . |
| 5,043,862 | 8/1991 | Takahashi ............................ 364/162 |
| 5,060,157 | 10/1991 | Tado .................................... 395/905 |
| 5,073,867 | 12/1991 | Murphy et al. . |
| 5,189,621 | 2/1993 | Onari ................................... 395/905 |
| 5,193,144 | 3/1993 | Tsutsumi ................................ 395/76 |
| 5,202,954 | 4/1993 | Miyazawa et al. . |
| 5,216,607 | 6/1993 | Diller .................................... 280/735 |
| 5,228,111 | 7/1993 | Nagazumi . |
| 5,243,687 | 9/1993 | Ando et al. . |
| 5,245,695 | 9/1993 | Basehore . |
| 5,245,698 | 9/1993 | Matsunaga . |
| 5,267,348 | 11/1993 | Someya ................................. 395/76 |
| 5,280,566 | 1/1994 | Nakamura . |
| 5,377,108 | 12/1994 | Nishio .................................. 280/735 |
| 5,396,424 | 3/1995 | Moriyama ............................ 280/735 |
| 5,483,449 | 1/1996 | Caruso .................................. 280/735 |
| 5,513,109 | 4/1996 | Fujishima ............................ 280/735 |
| 5,546,307 | 8/1996 | Mazur .................................. 280/735 |

OTHER PUBLICATIONS

Ruspini, "On the Semantics of Fuzzy Logic", International J. of Approximate Reasoning, vol. 5, Jan. 1991, pp. 45–88.

Mamdani, "Application of Fuzzy Algorithms for Control of Simple Dynamic Plant", Proceedings Institution of Electrical Engineers, London, vol. 121, No. 12, Dec. 1974, pp. 1585–1588.

Lee, "Fuzzy Logic in Control Systems: Fuzzy Logic Controller—Part I", IEEE Transactions on Systems, Man and Cybernetics, vol. 20, No. 2, Mar./Apr. 1990, pp. 404–418.

Devi et al., "Estimation of Fuzzy Memberships from Histograms", Information Sciences, vol. 35, 1985, pp. 43–59.

(List continued on next page.)

*Primary Examiner*—Tariq R. Hafiz
*Assistant Examiner*—Jeffrey Sam Smith
*Attorney, Agent, or Firm*—Lowe, Price, LeBlanc & Becker

[57] ABSTRACT

An arrangement (apparatus and method) using fuzzy logic for performing signal processing functions to determine the occurrence of an event, such as a vehicle crash. An acceleration sensor signal is fuzzified by comparison with dynamic membership functions having adjustable centers from feedback inputs. Each crisp input is fuzzified by determining the distance of the crisp input from the center of the membership function and linearly complementing the result with respect to the width of the membership function, thereby eliminating the necessity for determining the shape of the membership function. The dynamic membership functions are used to generate an average level signal, and an accummulated energy signal. A crash detection signal is generated after a comparison between the dynamically-adjusted average level and accummulated energy signals. The uses of the dynamic membership functions provide reliable detection and a low-cost implementation.

22 Claims, 19 Drawing Sheets

OTHER PUBLICATIONS

Braae et al., "Theoretical and Linguistic Aspects of the Fuzzy Logic Controller", Automatica, vol. 15, No. 5, 1979, pp. 553–577.

Zadeh, "Fuzzy Sets", Information and Control, vol. 8, 1965, pp. 338–353.

Tang, "Comparing Fuzzy Logic with Classical Controller Designs", IEEE Transactions of Systems, Man, and Cybernetics, vol. 17, No. 6, Nov./Dec. 1987 pp. 1085–1087.

Lee, "Fuzzy Logic in Control Systems: Fuzzy Logic Controller—Part II", IEEE Transactions on Systems, Man and Cybernetics, vol. 20, No. 2, Mar./Apr. 1990, pp. 404–418.

Ralston et al., "Fuzzy Logic Control of Machining", Manufacturing Review, vol. 3, No. 3, Sep. 1990, pp. 147–154.

Lippmann, "An Introduction to Computing with Neural Nets", IEEE ASSP Magazine, Apr. 1987, pp. 4–21.

Zadeh, "Outline of a New Approach to the Analysis of Complex Systems and Decision Processes", vol. 3, No. 1, IEEE Transactions on Systems, Man, and Cybernetics, vol. 3, No. 1, Jan. 1973, pp. 28–44.

Kohoutek, "Practice of Approximate Reasoning", Proceedings of Manufacturing International '90, Atlanta, Ga., mar. 25–28, 1990, vol. 5: Design, Reliability, and Education of Manufacturability, pp. 63–68.

Schwartz, "Fuzzy Tools for Expert Systems", AI Expert, vol. 6, No. 2, Feb. 1991, pp. 34–41.

Chiu et al., "A Fuzzy Logic Programming Environment for Real-Time Control", International Journal of Approximate Reasoning, 1988, pp. 163–175.

Watanabe et al., "A VLSI Fuzzy Logic Controller with Reconfigurable, Cascadable Architecture", IEEE Journal of Solid State Circuits, vol. 25, No. 2, Apr. 1990, pp. 376–382.

Zadeh, "Fuzzy Logic", Computer, Apr. 1988, pp. 83–93.

Togai et al., "Expert System on a Chip: An Engine for Real-Time Approximate Reasoning", IEEE Expert, Fall 1986, pp. 55–62.

Leung et al., "Fuzzy Concepts in Expert Systems", Computer, Sep. 1988, pp. 43–56.

Mizumoto et al., "Comparison of Fuzzy Reasoning Methods", Fuzzy Sets and Systems, 1982, vol. 8, pp. 253–283.

Cox, "Adaptive Fuzzy Systems", IEEE Spectrum, Feb. 1993, pp. 27–31.

Russo, "A Fuzzy Approach to Digital Signal Processing: Concepts and Applications" IEEE Intrumentation and Measurement Technology conference Dec. 1992.

Legg, "Microcontrollers embrace Fuzzy Logic" EDN, v38, n19, p100 Sep. 1993.

Arakawa, "Fuzzy Rule-Based Signal Processing and its Application to Image Restoration," IEEE Journal on Selected Areas in Communications Dec. 1994.

FIG. IA
*(Prior Art)*
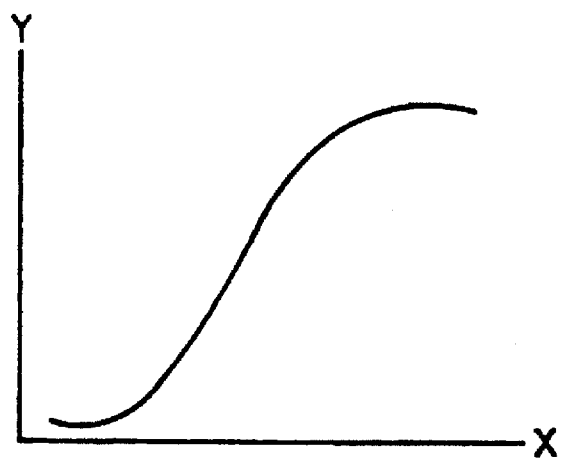
FIG. IB
*(Prior Art)*
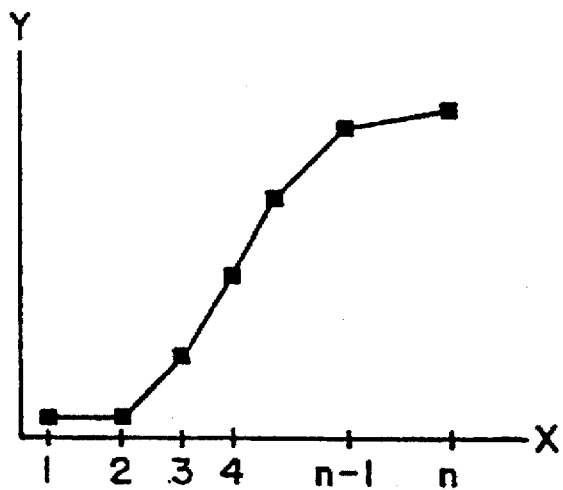
FIG. IC
*(Prior Art)*
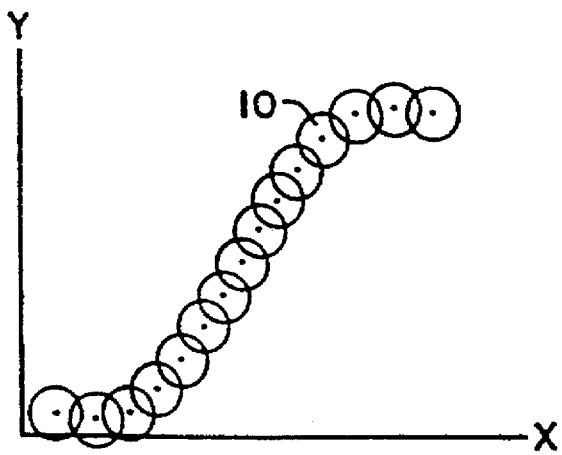

FUZZY MICROCONTROLLER FOR COMPLEX NONLINEAR SIGNAL RECOGNITION

This application is a continuation-in-part of pending application 08/041,235, filed Mar. 31, 1993, issued as U.S. Pat. No. 5,412,752, which is a continuation-in-part of pending application 07/893,093, filed Jun. 3, 1992, issued as U.S. Pat. No. 5,459,816, which is a continuation-in-part of application Ser. No. 07/712,871, filed Jun. 12, 1991, which issued on Sep. 14, 1993 as U.S. Pat. No. 5,245,695.

BACKGROUND OF THE INVENTION

1. Field of the Invention

The present invention relates to controllers and rule-based expert control systems using fuzzy logic and parallel processing for controlling devices.

2. Description of the Related Art

Control systems and computer-controlled electronic devices have historically been controlled by digital control systems. Such control systems use bi-state digital logic which requires a value of either "TRUE" or "FALSE", so that approximations are often required for real-world control problems. For example, an input/output relationship y=f(x) would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function y=f(x). If digital logic was used to characterize the function y=f(x), it would be necessary to approximate the function shown in FIG. 1A by using discrete values, $Y_i=a_i \cdot x_i$ (i=1, 2, ..., n), as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L. Zadeh in 1963. Rather than evaluating the two values "TRUE" and "FALSE" as in digital logic, fuzzy terms admit to degrees of membership in multiple sets so that fuzzy rules may have a continuous, rather than step-wise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function f(x) is approximated by a plurality of fuzzy sets 10 which overlap. Rather than approximating a continuous value x by a discrete value $x_i$, fuzzy logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy member may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc. Exemplary publications describing the theory and applications of fuzzy logic include Devi, B. B. et al, Estimation of Fuzzy Memberships from Histograms, Information Sciences, vol. 35, 1985, pp. 43–59; Braae, M. et al., Theoretical and Linguistic Aspects of the Fuzzy Logic Controller, Automatica, vol. 15, issue 5, 1979, pp. 553–77; Ralson, P. A. S., Fuzzy Logic Control of Machining, Manufacturing Review, vol. 3, no. 3, September 1990, pp. 147–154; Schwartz, Tom J., Fuzzy Tools for Expert Systems, AI Expert, February 1991, pp. 34–41; Kohoutek, H. J., Practice of Approximate Reasoning, Proceedings of Manufacturing International '90 (1990: Atlanta, Ga.) Vol. V: Design, Reliability, and Education of Manufacturability; Lee, Chuen C., Fuzzy Logic in Control Systems: Fuzzy Logic Controller—Parts I & II, IEEE Transactions on Systems, Man and Cybernetics vol. 20, issue 2, March/April 1990, pp. 404–418, 419–435; Mamdani, E. H., Application of Fuzzy Algorithms for Control of Simple Dynamic Plant, Proceedings of the IEEE, vol. 121, issue 12, December 1974, pp. 1585–1588; Tang, K. L. et al., Comparing Fuzzy Logic with Classical Controller Designs, IEEE Transactions on Systems, Man and Cybernetics, vol. 17, issue 6, November/December 1987, pp. 1085–1087; Zadeh, L. A., Fuzzy Sets, Information and Control, vol. 8, 1965, pp. 338–353; Zadeh, L. A., Outline of a New Approach to the Analysis of Complex Systems and Decision Processes, IEEE Transactions on Systems, Man and Cybernetics, Vol. 3, issue 1, January 1973, pp. 28–44; and Ruspini, Enrique H., On the Semantics of Fuzzy Logic, International Journal of Approximate Reasoning 1991, vol. 5, pp. 45–86. These publications, which describe in detail the theory of fuzzy logic, are incorporated herein by reference.

The implementation of fuzzy logic for a controller has been suggested by Ralston et al. (1990). As shown in FIG. 2, a "universe of discourse" (e.g., a dimension of continuous values) is defined in step 20 for input and control variables. Membership functions are then defined in step 22 which determine the way observations of the variables are expressed as fuzzy sets. In other words, the fuzzy sets, which are subsets of the universe of discourse, are defined by their respective membership functions. A rule base is then formulated or constructed in step 24 to supply the logic that relates observations applied to the controller input to the required fuzzy control statements; a rule may have the format "IF (Alpha IS SMALL) AND (Beta IS MEDIUM) THEN Gamma IS BIG". A computational unit is then designed in step 26 that uses the rule base to logically obtain control statements from the fuzzy inputs; the computational unit will provide fuzzy outputs in response to the process observations, e.g., the fuzzy inputs. Finally, an action interface is defined in step 28 which will provide rules to translate fuzzy control statements into discrete, crisp values for the input variables applied to the input of the controlled device or process.

The implementation of fuzzy logic in control systems, while promising, has encountered numerous problems. For example, the construction of membership functions may be relatively difficult: the optimum membership function is related to sensor characteristics, control responses, and other dynamic factors. Thus, the determination of the optimum membership function in some cases may only be accomplished empirically. This difficulty in determining the membership function translates into the problem of properly classifying an input into the corresponding fuzzy set.

An additional problem of current fuzzy control systems is the increase in cost due to attempts to increase processing speed.

Highly parallel architectures which are faster than the classic von-Neumann architecture have recently been proposed by Lippman (1987). While these neural net classifiers are faster than the classic von-Neumann machine, the relatively large number of parallel connections in the neural net increases the size of an IC chip, and thus increases the overall cost of the system.

Further, more advanced applications of fuzzy logic may require a fuzzy logic microcontroller capable of processing complex membership functions that have varying parameters. For example, a fuzzy logic application may have a fuzzy set having a membership function that varies with respect to time or a given input parameter. Thus, unless the membership function can be defined on the basis of the varying parameter, the definition of the membership function would need to be continually updated during processing, thereby adding substantial complexity to the fuzzifying process. In other words, any adaptive fuzzy logic system would require expert systems to modify the characteristics of the fuzzy logic rules and the topology of the fuzzy sets. Such a system would be costly and complex because of the relatively large memory and processing requirements. Since the proposed system would be trained by prior experiences and not logically trained, an initial training interval would be necessary before the proposed system could be usable. The proposed system would also suffer the risk of following into a local minimum during training, thereby reducing the system's overall efficiency.

Therefore, it would be desirable to provide a simple implementation of fuzzy sets that have membership functions defined on the basis of varying parameters in order to provide a fully adaptive fuzzy logic system.

The fuzzy microcontroller in commonly-assigned U.S. Pat. No. 5,245,695 to Basehore fuzzified a number of inputs and determined an optimum rule from a set of rules corresponding to an output. The optimum rule had a corresponding action value which was either output directly in an immediate mode or added as an offset to the previous output value in an accumulate mode: this step was known as defuzzifying the output signal. However, different fuzzy logic applications may have different desired outputs. For example, U.S. Pat. No. 5,245,695 to Basehore disclosed an application combining a plurality of fuzzy microcontrollers by coupling the output of one microcontroller to the input of a second microcontroller; it would be desirable to directly output the fuzzy results of the first microcontroller as raw data for the second microcontroller. Further, it would be desirable to provide an output mode which outputs a result based upon the average of all the rules considered valid during the determination of the optimum rule.

Further, the fuzzy microcontroller disclosed in U.S. Pat. No. 5,245,695 to Basehore cycled through a predetermined number of inputs during the fuzzification of the inputs using a predetermined number of fuzzifiers and a predetermined number of rules, regardless of the needs of the application. Consequently, the fuzzy microcontroller disclosed in U.S. Pat. No. 5,245,695 to Basehore would have the same throughput even if only one fuzzifier or one rule was being processed. It would be desirable to provide a system that provided maximum design flexibility to ensure optimum performance and minimal cost for a designer's specific application.

In addition, it would be desirable to provide a fuzzy logic control system having such design flexibility in order to expand the use of fuzzy logic into applications that have historically used microprocessor-based solutions. For example, complex nonlinear signal recognition techniques have generally applied Fourier analysis to analyze time-varying waveforms in order to determine the occurrence of a predefined event. It has often been erroneously assumed that if the Fourier representation of a time-varying signal matches a predetermined pattern, the event must have occurred. The Fourier-based signal recognition system may, however, generate a false-positive signal that erroneously identifies occurrence of the predefined event in cases where the signal has no repetitive pattern, such as in a voice signal or an impact acceleration sensor in an automobile. On the other hand, efforts to provide a more advanced Fourier-based signal recognition system inherently result in larger signal processing requirements, thereby resulting on a system having a greater time lag, or a more expensive system to perform the additional signal processing tasks in the same amount of time.

It would be desirable to provide a low-cost, fuzzy logic-based system that accurately performs complex nonlinear signal recognition functions with a minimum amount of processing delays.

SUMMARY OF THE INVENTION

It is an object of the present invention to provide a low cost fuzzy logic microcontroller for efficient performance in cost-critical control systems.

It is a further object of the present invention to provide a fuzzy logic microcontroller which is easily implemented for desired control applications.

It is still another object of the present invention to provide a low-cost fuzzy logic microcontroller which has flexible processing capabilities for complex fuzzy logic applications, such as complex nonlinear signal recognition.

These and other objects of the present invention are achieved by a fuzzy logic processor system, also referred to as fuzzy microcontroller, that includes several advantageous features which together are able to provide efficient processing from a large number of inputs. The fuzzy logic processor system includes a fuzzy input processor, a fuzzy output processor and a fuzzy memory interface. Each of these elements of the fuzzy logic processor system are designed for maximum flexibility and may be used separately with other digital systems as cores for Application Specific Integrated Circuit (ASIC) designs. Since each of these elements are available as ASIC cores, the customization of fuzzy circuits becomes easier and more affordable.

The fuzzy microcontroller of the present invention performs complex nonlinear signal recognition, whereby the elements of the fuzzy logic processor enable adaptive recognition of a complex nonlinear signal to determine, as well as anticipate, the occurrence of a predefined event. While the fuzzy microcontroller of the present invention can be adapted to emulate signal processing functions, the fuzzy microcontroller can also provide a self-adapting complex nonlinear signal recognition system capable of distinguishing between transient signal patterns and signal patterns identifying occurrence of an actual event. Thus, the fuzzy microcontroller provides complex nonlinear signal recognition for applications in medical technologies (such as monitoring events in a body signal, such as a QRS complex in an electrocardiograph signal, or an electroencephalograph signal), or automotive technologies (such as crash detection for an airbag trigger circuit, or shock absorber controllers).

The fuzzy input processor of the fuzzy microcontroller, also known as a fuzzy processor, directly receives input data and membership function parameter data, namely membership function center, width and type. The input data includes the complex nonlinear signal data, which may be supplied directly or from a multiplexer-based system; the input data may also include memory data or loop-back data. The fuzzy input processor successively determines a membership value for each data input. After fuzzification, the fuzzified input signals are processed in accordance with predetermined fuzzy logic rules established in accordance with the designer's specific application parameters in order to determine the optimum rule for execution. Once the optimum rule is identified, the fuzzy logic processor system executes the optimum rule.

The fuzzy input processor determines the similarity of each crisp input, for example a complex nonlinear signal from an automobile impact acceleration sensor, to a fuzzy set having a membership function $\tilde{I}$ by determining the distance of the crisp input from a defined center of the membership function $\tilde{I}$; the distance of the crisp input is then linearly complemented with respect to the width of the membership function $\tilde{I}$ so that the resulting similarity signal is a maximum when the distance is a minimum, and, conversely, a minimum when the distance is a maximum (e.g., when the crisp input exceeds the width of the membership function $\tilde{I}$). The fuzzy input processor fuzzifies the input in accordance with the supplied membership function parameter data to obtain a fuzzified input signal. The membership function parameter data is directly supplied to the fuzzy input processor so that a membership function center may be defined as a predetermined center or as corresponding to an input source. The assignment of an input source to be a center value causes the corresponding membership function to have a variable, or "floating" center. Since an input may either be an external signal, a feedback signal or an internal timing signal, the use of such floating centers are particularly effective in the complex nonlinear signal recognition applications requiring time-variable membership functions, as well as applications comparing two changing inputs to determine a differential or to eliminate a noise component. Similarly, the membership function width data can be supplied from memory as predetermined data or from any of the dynamic sources described above. Thus, the present invention provides the ability to implement dynamic width fuzzifiers. As a result, the present invention provides a self-adapting fuzzy logic system capable of performing complex nonlinear signal recognition without modification by expert systems.

The fuzzy input processor includes a Min/Max comparator for successively comparing the fuzzified input signals to each other in accordance with predetermined fuzzy logic rules established in accordance with control system output parameters. In other words, an output of the fuzzy logic processor system will be determined on the basis of its predetermined rules and the fuzzified input signals. Each output has a set of rules and each rule has a set of rule terms. The Min/Max comparator sequentially determines the fuzzy input signals which represent the minimum value term in the rule currently processed. The Min/Max comparator then successively compares each of the minimum value terms for each rule and identifies for the output processor the winning rule that provides the optimum output given the fuzzified inputs. The use of the Min/Max comparator provides minimum use of silicon on a semiconductor chip, resulting in a lower cost for the semiconductor chip.

The use of fuzzy logic provides relatively simple implementation of control devices that typically have required constant adjustments due to dynamically-changing environments. For example, the inventors of the present application have identified automobile airbag activation systems as a particularly effective application for the above-described fuzzy microcontroller. Prior art airbag activation systems have relied on acceleration sensors to identify the need for deployment of an airbag. However, it is also known in the prior art that false triggers of airbag systems have occurred due to sudden acceleration changes, for example when a vehicle hits a pothole. At the same time, however, it is desirable that any improved crash detection system have a minimal increase in cost. Thus, an additional object of the present invention is to provide a low-cost, dynamically-adjustable crash detection system for controlling activation of crash-defensive systems, such as deployment of airbags or locking of passive restraint systems.

In a specific aspect of the present invention, the fuzzy microcontroller performs complex nonlinear signal recognition for detecting automotive impact conditions from acceleration sensor signals in order to deploy crash-defensive systems, such as deployment of an airbag. According to the present invention, the fuzzy microcontroller monitors at least one acceleration signal during automotive operation, and outputs feedback signals used as centers for membership functions in order to dynamically adjust the membership functions and the feedback signals on the basis of variations in the acceleration signal. A first of these feedback signals measures the differential change in the acceleration signal, and a second of these feedback signals measures the average, or low-frequency component, of the acceleration signal. The fuzzy microcontroller maintains a dynamic accumulated energy value in accordance with a set of rules defined by the dynamically adjusted membership functions; if the dynamic accumulated energy value reaches a threshold corresponding to the average/low frequency component of the acceleration signal, the fuzzy microcontroller outputs a trigger signal to an airbag activation device indicating that the acceleration sensor has sensed sufficient energy over time to trigger the airbag device.

Thus, the low-cost fuzzy microcontroller provides accurate monitoring of an automotive acceleration signal based on detected accumulated energy in order to accurately trigger an airbag activation device.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein:

FIGS. 1A, 1B AND 1C illustrate the logical distinctions between digital logic and fuzzy logic;

DETAILED DESCRIPTION OF THE PREFERRED EMBODIMENT

The preferred embodiment of the present invention will now be described with reference to the accompanying drawings.

The preferred embodiment is implemented as a fuzzy microcontroller performing complex nonlinear signal recognition specifically with respect to measuring an acceleration sensor signal in order to detect the occurrence of a vehicle crash. The fuzzy microcontroller is preferably manufactured as a low-cost ASIC. To gain a better understanding of the implementation of the fuzzy microcontroller signal recognition functions, a description will first be given of the overall fuzzy microcontroller architecture, followed by a detailed description of the fuzzy microcontroller used for detecting the occurrence of a vehicle crash.

Figure 2:
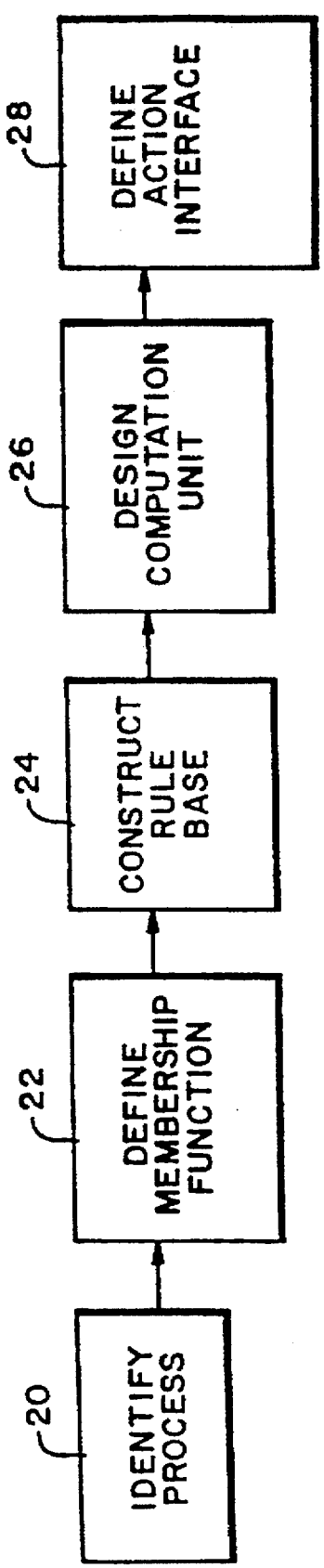
FIG. 2 discloses a conventional method for fuzzy logic in a controller.
Figure 3:
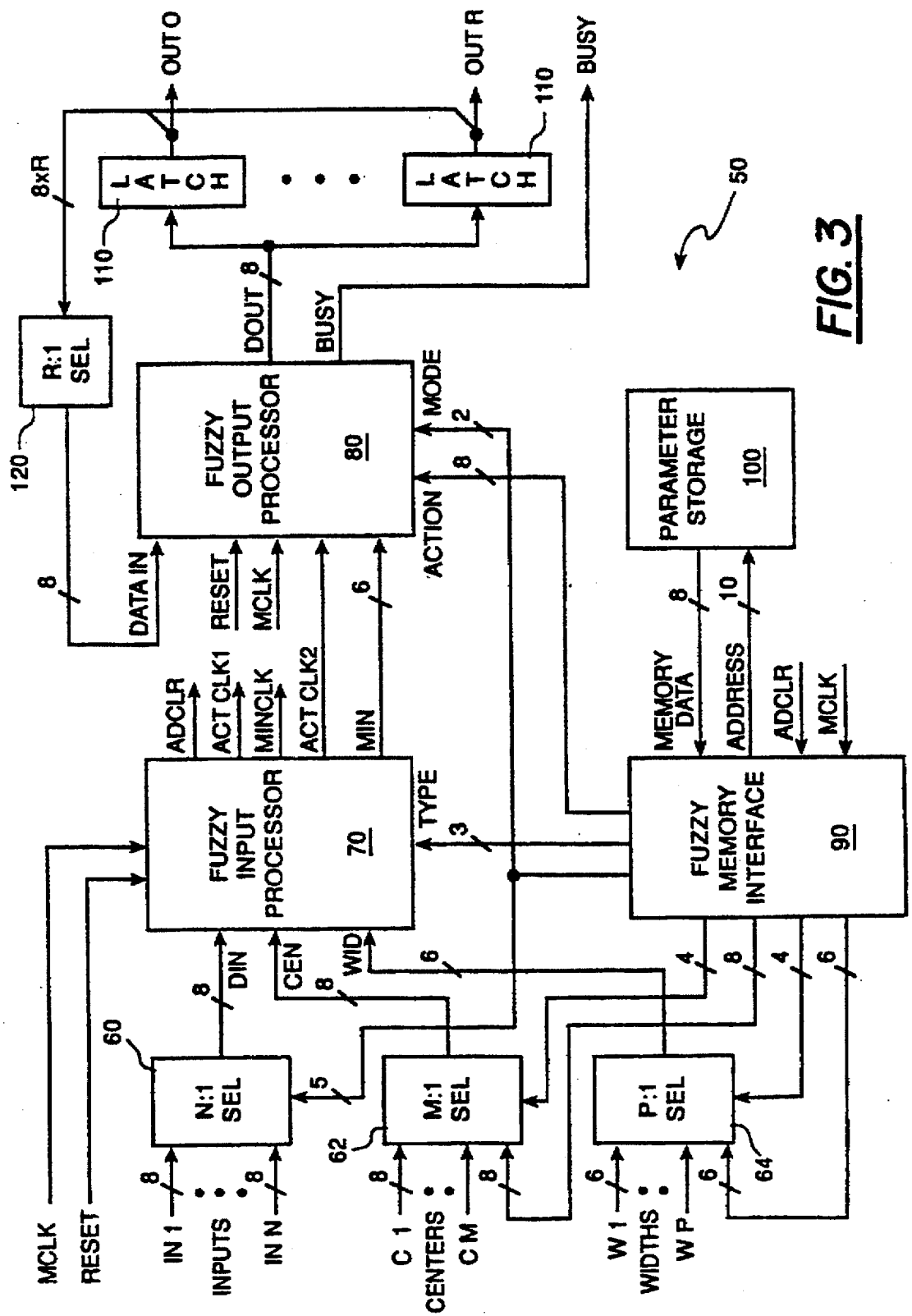
FIG. 3 discloses a block diagram of the fuzzy microcontroller according to a preferred embodiment of the present invention.

FIG. 3 discloses a block diagram of the fuzzy processor system according to a preferred embodiment of the present invention and designated generally by the reference character 50. The fuzzy processor system, 50 may control a plurality of devices by outputting an output signal DOUT to a corresponding controlled device (not shown in FIG. 3). The value of the output signal DOUT is determined by the rules associated with the output signal and the signals input to the fuzzy processor system 50. In other words, each output signal is the result of a predetermined set of rules which define the action to be taken by the output signal under certain input conditions. The fuzzy processor system 50 of the present invention compares the input signals to each of the rules, one rule at a time, to determine which rule will provide the optimum output.

As shown in FIG. 3, the fuzzy processor system 50 includes a set of selectors 60, 62 and 64, a fuzzy input processor 70, a fuzzy output processor 80, a fuzzy memory interface 90, a storage device 100 and a set of output latches 110.

Although not shown, it is assumed there is an external rule address counter for processing each rule of an output, and decoders for controlling the selectors 60, 62 and 64 and the output latches 110. One of ordinary skill in the art would be able to readily implement the address counter, decoder, and any other necessary logic in view of the following description.

The input selector 60 selects one of a plurality of inputs as data to be fuzzified in response to a 5-bit input select signal from the fuzzy memory interface 90. The inputs may be from any external source such as a multiplexer (not shown) which time-multiplexes a plurality of sensor signals, for example. Although the input signal may be either analog or digital, the preferred embodiment uses an eight (8) bit digital word so that the input selector 60 receives a data stream of 8-bit digital input signals from each of the external sources. One of ordinary skill in the art will realize that the input selector 60 can accommodate analog TDM inputs by configuring the input selector 60 for TDM inputs and including an 8-bit A/D converter.

The center selector 62 and the width selector 64 select one of a plurality of inputs for center and width data in response to 4-bit center select and width select signals, respectively. The center select and width select signals, supplied by the fuzzy memory interface 90, enable a designer to create a variety of membership functions by combining the center and width parameter data from different sources. Like the input selector 60, the inputs to the center selector 62 and the width selector 64 can be any digital inputs, such as a stored value, a digitized sensor signal or a clock signal. Therefore, the center or width of any membership function can be either a fixed or a dynamic value based upon time, temperature, force, distance, etc. As a result, the present invention enables the processing of dynamic membership functions. This feature is particularly effective in control systems having instability problems such as the crash detection application discussed below, and enables a self-adapting fuzzy logic system by defining the center and width of membership function on the basis of dynamic parameters.

FIG. 3 shows that the fuzzy memory interface 90 also supplies center and width data to the center selector 62 and the width selector 64, respectively. Thus, the fuzzy memory interface 90 enables the fuzzy input processor 70 to receive the fuzzy set parameter data from a variety of sources, including the external memory storage device 100, which may be implemented on the same integrated circuit or on a separate circuit.

The fuzzy input processor 70 receives the selected 8-bit input data (DIN), center data (CEN) and 6-bit width data (WID) from the corresponding selector. The fuzzy input processor also receives a 3-bit type command signal (TYPE) from the fuzzy memory interface 90 that indicates the type of membership function being used (described in detail below).

The selected input data signal (DIN) is fuzzified in accordance with the corresponding fuzzy set parameter data, namely center data (CEN), width data (WID) and the type command signal (TYPE).

The fuzzy input processor 70 sequentially processes the supplied data to determine the minimum rule term for each rule of a given output and the relative maximum for all the rules processed for the given output. In other words, a given output has a set of predetermined rules. Each rule has a set of rule terms that define the rules. As a result, the data inputs corresponding to a single rule are grouped together for successive processing.

The fuzzy input processor 70 successively processes the selected group of fuzzy inputs in accordance the rule being processed. The fuzzy input processor 70 determines whether the fuzzy logic rule has a likelihood of being executed on the basis of the fuzzified input signals. For example, a rule may be of the form "IF (Temp IS HOT) AND (Beta IS VERY_HUMID) AND (Motor IS LOW) THEN INCREMENT Motor BY BIG_INCREASE". Each of the terms (e.g., "Temp IS HOT") of the rule is compared with the corresponding fuzzy input (e.g., "Temp") to determine whether there is a low or high correlation. The correlations of each of the rule terms are then compared to determine the minimum level of correlation amongst the rule terms. The minimum rule term (e.g., the rule term having the minimum level of correlation) represents the overall likelihood of the rule being executed on the basis of the fuzzified input signals. The fuzzy input processor 70 determines the minimum rule term for each rule sequentially, for example, one rule at a time. As described in detail below with respect to FIG. 8 the minimum rule term can be saved and applied to the subsequent rule being processed, thereby concatenating a plurality of rules to determine the minimum rule term.

The fuzzy input processor 70 outputs the minimum rule term as a 6-bit minimum term signal (MIN) and sets a strobe (MINCLK) that indicates new minimum data that is valid for data access. The fuzzy input processor 70 also compares the minimum rule term of the selected rule with the minimum rule terms of other corresponding rules and identified the rule which has the maximum value for the minimum rule term. As described in detail below, the fuzzy input processor 70 outputs an action clock (ACT CLK1) when the minimum rule term under comparison (output as the current minimum term signal (MIN)) is greater than the previously stored minimum rule term, e.g., whenever a new winning rule has been determined. The fuzzy input processor 70 outputs a second action clock (ACT CLK2) at the end of the processing cycle of the last rule of a given output. As discussed in detail below, the last rule of a given input is identified by the type command signal (TYPE).

Therefore, the winning rule for a given output can be determined by monitoring the action clock (ACT CLK1), and can be used to latch on action address into an external register. The action clock (ACT CLK2) verifies the last occurrence of the action clock (ACT CLK1) as representing the optimum rule for the given output.

The fuzzy output processor 80 receives the 6-bit minimum rule term signal (MIN) and the second action clock (ACT CLK 2) from the fuzzy input processor 70. The fuzzy output processor also receives an 8-bit action value of a processed rule (ACTION) and a 2-bit defuzzifying mode signal (MODE) from the fuzzy memory interface 90. FIG. 3 shows that the fuzzy output processor 80 also receives a selected feedback signal (DATA IN) from a selector 120. As described in detail below, the fuzzy output processor 80 outputs a result (DOUT) for the winning rule to output latches 110 in accordance with one of the following selectable modes: Immediate, Accumulate and Weighted Average. The mode is selected in accordance with the defuzzifying mode signal (MODE).

Figure 4:
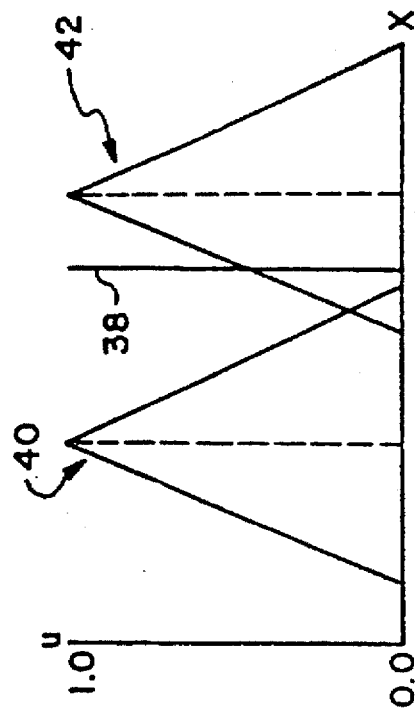
FIG. 4 illustrates a relationship between two fuzzy sets and a crisp input.

The fuzzifying method of the present invention will now be disclosed with reference to FIGS. 4 and 5A-5F. FIG. 4 illustrates a relationship between a crisp input 38 and two arbitrarily selected and exemplary fuzzy sets 40 and 42 having membership functions A and B. The term "crisp" refers to any input or output which yields a single, precise value. Since most sensors produce, and most actuators require, scalar values, the fuzzy processor system 50 of the present invention accepts crisp inputs and can provide crisp outputs.

Each membership function specifies a relationship between the crisp input 38 and the corresponding fuzzy set. In other words, the membership functions determine the size of the fuzzy sets 10 shown in FIG. 1C. The evaluation of the conjunction of the crisp input 38 with a membership function results in a "fuzzy term": the term represents the degree of membership or non-membership of the crisp input 38 in the corresponding fuzzy set. Since it is a fuzzy number, the term may be used in subsequent fuzzy rules, similar to Boolean operations.

Figure 5B:
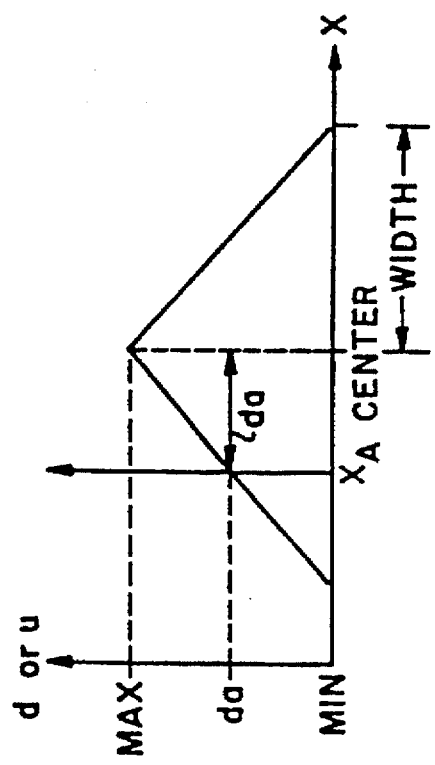
FIGS. 5A–5F illustrate exemplary relationships between a fuzzy set and a range of inputs on the basis of the membership function of the fuzzy set according to the fuzzifying method of the present invention.
Figure 5A:
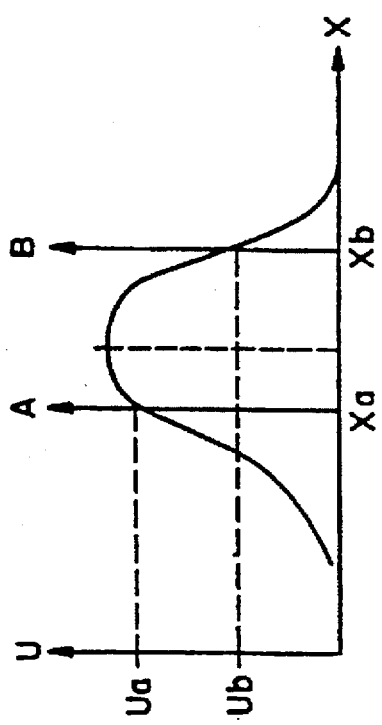

Thus, the membership function in a fuzzy system defines the degree of similarity between an unknown input and a known value or class (for example, the fuzzy set). As shown in FIG. 5A, the degree of membership $\tilde{I}_a$ for a crisp input A having a value $X_a$ occurs at the point where the crisp input A intersects the membership Function C. However, due to nonlinearities in the control system (for example, sensor characteristics, control responses, dynamic responses) the membership function μ may be nonlinear relative to the input dimension X, making the determination of the membership function shape, and hence the similarity determination, difficult to implement.

In order to avoid the determination of the membership function shape, the fuzzifying method of the present invention predefines the slope of the membership function, and determines the distance between the crisp input and the center of the membership function. As shown in FIG. 5B, the membership function D is defined to be linear with a predetermined slope (for example, the slope is one-to-one). Rather than determining the intersection point of the membership function and the crisp input $X_A$, the fuzzifying method measures the distance da by subtracting the crisp input from the known center value and ignoring the sign. The difference is then complemented with respect to the width of the membership function D so that if the input and the center are the same, then the similarity value da is a maximum, whereas if the input is further from the center, the similarity value approaches a minimum.

Figure 5C:
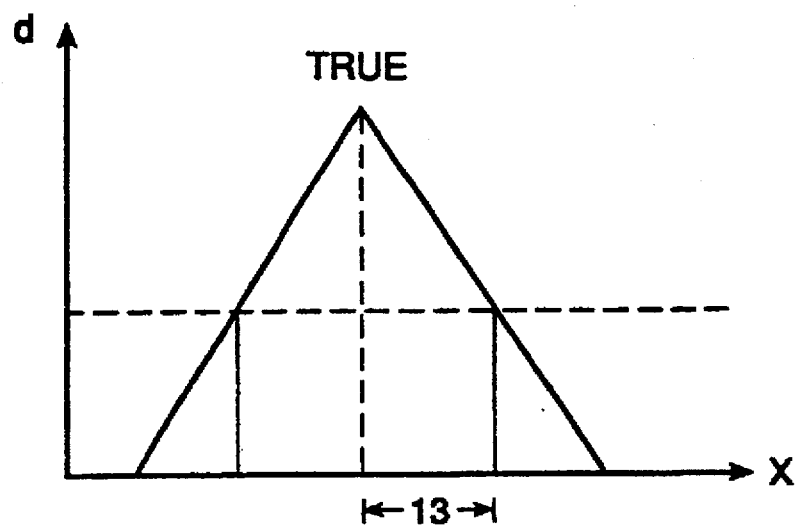
Figure 5D:
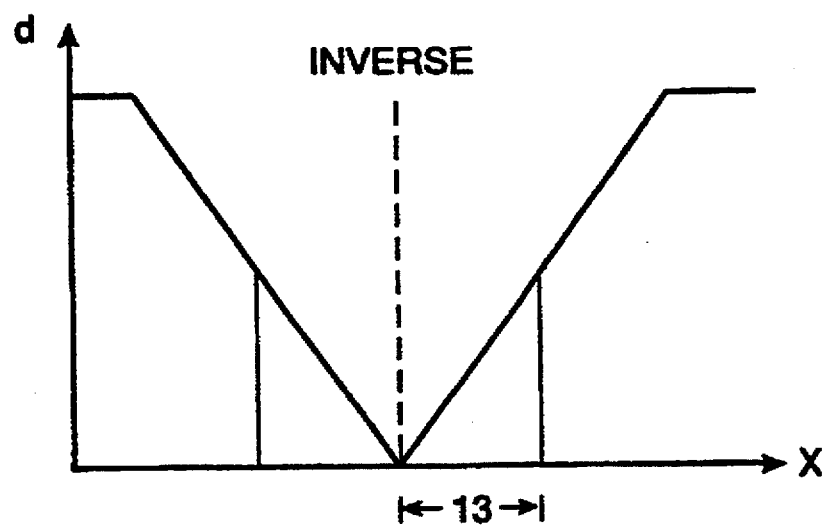

FIGS. 5C and 5D show a membership function having true (inclusive) and inverse (exclusive) polarity, respectively. The dashed lines extending from the membership function illustrate the shape of the membership function if the width was set at a maximum for the inclusive membership function, and a minimum for the exclusive membership function. In other words, although the width of the membership functions in FIGS. 5C and 5D are set at a value of "13", the maximum width according to the preferred embodiment is "63" for inclusive. Therefore, is a crisp input X was outside the membership function of FIG. 5C, the similarity value would be forced to the minimum or zero.

Figure 5F:
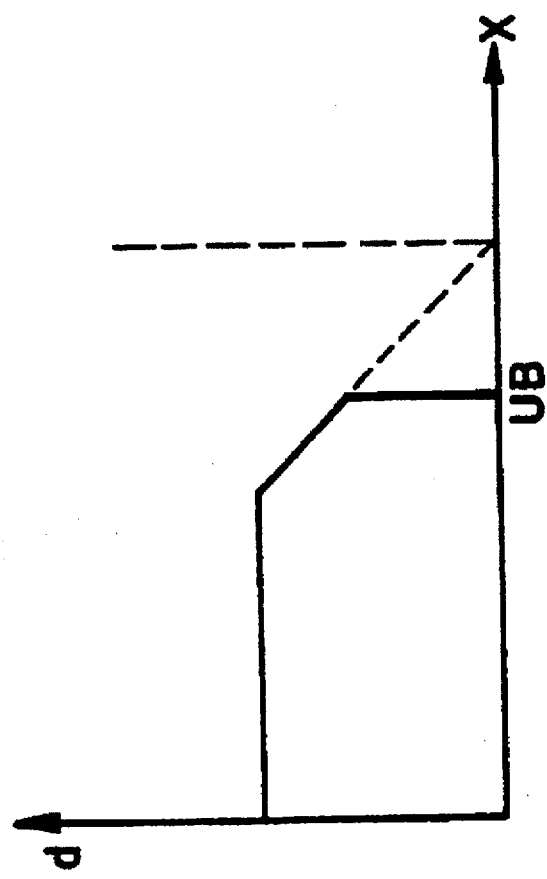
Figure 5E:
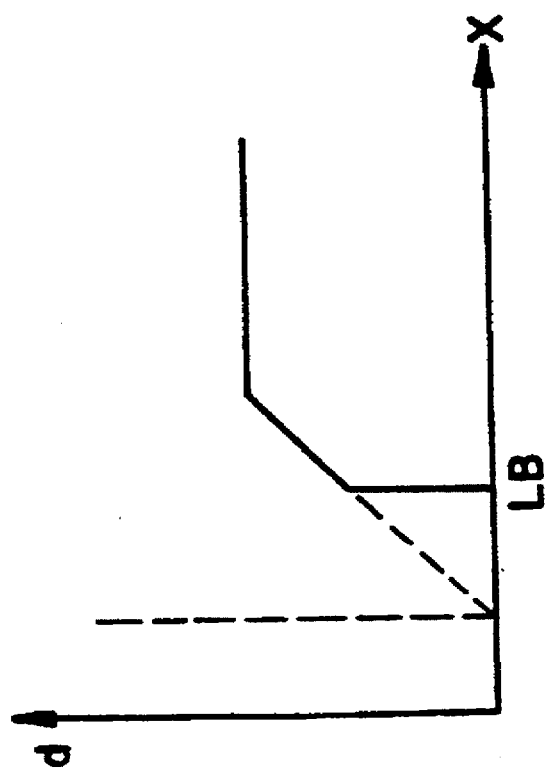

FIGS. 5E and 5F show membership functions for Greater Than and Less Than membership functions, respectively, each having inclusive polarity. In order for a crisp input to be a member of the Greater Than membership function, the distance between the crisp input and the center value must be greater than or equal to the lower boundary LB of the present width value; conversely, in order for a crisp input to be a member of the Less Than membership function shown in FIG. 5F, the distance between the crisp input and the center value must be less than or equal to the upper boundary UB of the present width value. It will be recognized using conventional Boolean operations as applied to fuzzy logic that a Greater Than membership function having inverse (exclusive) polarity will be equal to a Less Than membership function having a true (inclusive) polarity. Thus, FIG. 5E can also be considered as showing a "Left-Exclusive" membership function, and FIG. 5F can be considered as showing a "Right-Exclusive" membership function.

The advantages of the fuzzifying method of the present invention are that a designer of a control system is not required to determine a membership function shape for all fuzzy sets, and also that the fuzzifying method can be easily implemented in hardware. Further, the Less Than and Greater Than membership functions are asymmetrical membership functions. Consequently, utilization of both asymmetrical membership functions, via rule selection, provides the ability to define an adjustable height membership function. A preferred embodiment of the fuzzifying method is disclosed with reference to FIG. 7 (see below).

Figure 6:
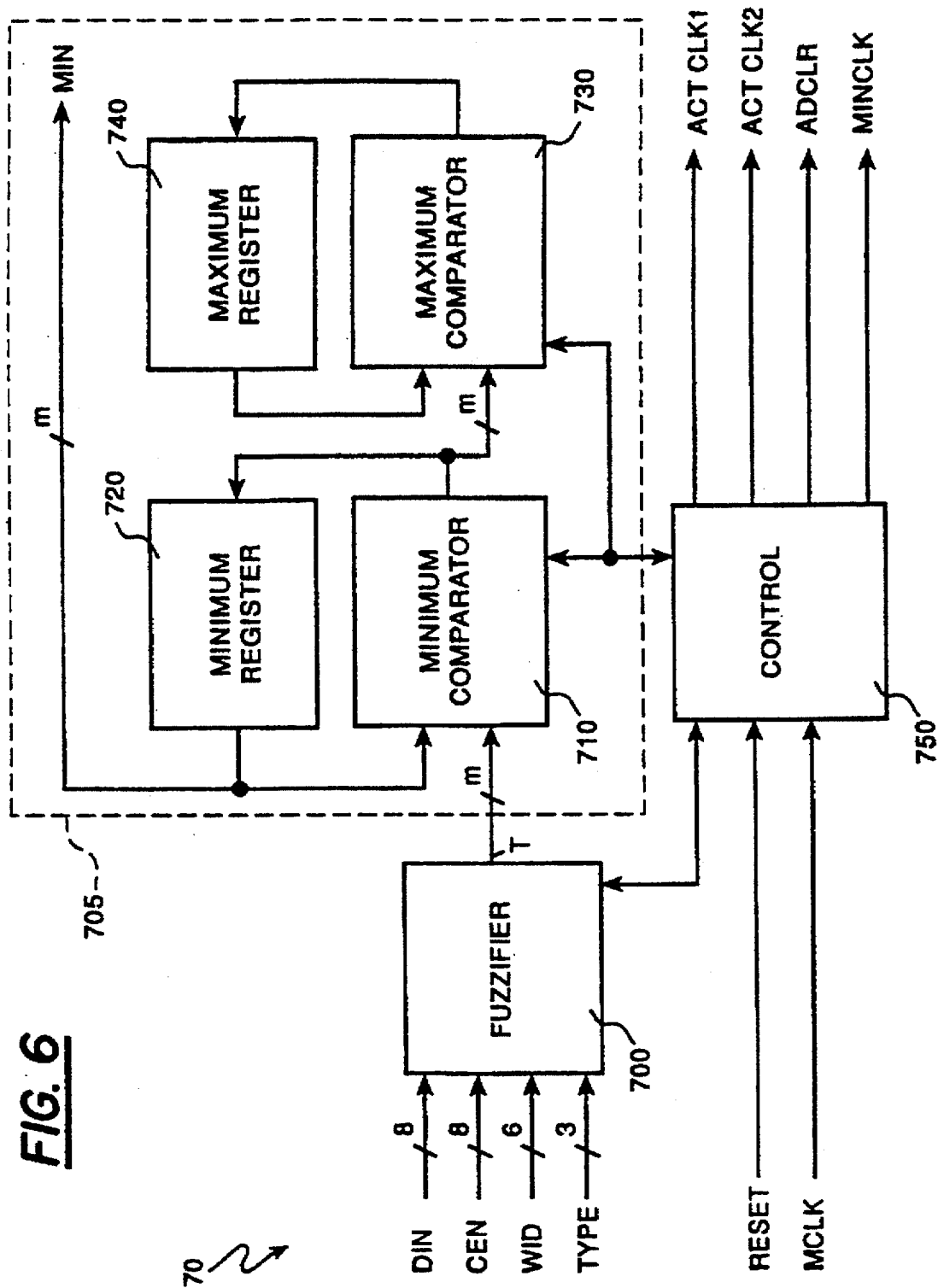
FIG. 6 discloses a block diagram of the fuzzy input processor of FIG. 3.

FIG. 6 shows a functional block diagram of the fuzzy input processor 70 of FIG. 3. The fuzzy input processor 70 includes a fuzzifier 700, a Min/Max circuit 705 and a control circuit 750. The Min/Max circuit 705, also referred to as a rule processor, includes a minimum comparator 710, a minimum register 720, a maximum comparator 730 and a maximum register 740.

The fuzzifier 700 fuzzifies the 8-bit input data (DIN) in accordance with the supplied fuzzy set parameter data, namely the 8-bit center data (CEN), the 6-bit width data and the 3-bit type command signal (TYPE). The data is latched on the rising edge of the clock (MCLK). The type command signal (TYPE) identified which of the membership functions of FIGS. 6C–6F are being processed. Alternately, the type command signal (TYPE) indicates the completion of processing of the rule terms for a given rule, or the completion of the last rule for a given output. Table 1 summarizes the 3-bit definitions for the type command signal (TYPE):

TABLE 1

| TYPE | DEFINITION |
| --- | --- |
| 000 | Last Rule Processed |
| 001 | Last Term in the Current Rule |
| 010 | Symmetrical Inclusive |
| 011 | Symmetrical Exclusive |
| 100 | Right Inclusive |
| 101 | Right Exclusive |
| 110 | Left Inclusive |
| 111 | Left Exclusive |

Thus, the fuzzifier 700 outputs the fuzzified input as a rule term (T) to the minimum comparator 710 in accordance with the type of membership function selected.

The control circuit 750 outputs the strobe signals ACT CLK1, ACT CLK2, ADCLR and MINCLK in accordance with the operations of the fuzzifier 700 and the Max/Min comparator 705. The address clear (ADCLR) signal is used to set any external rule memory address counter and is set following the action clock (ACT CLK2) or whenever the RESET signal is received.

Figure 7A:
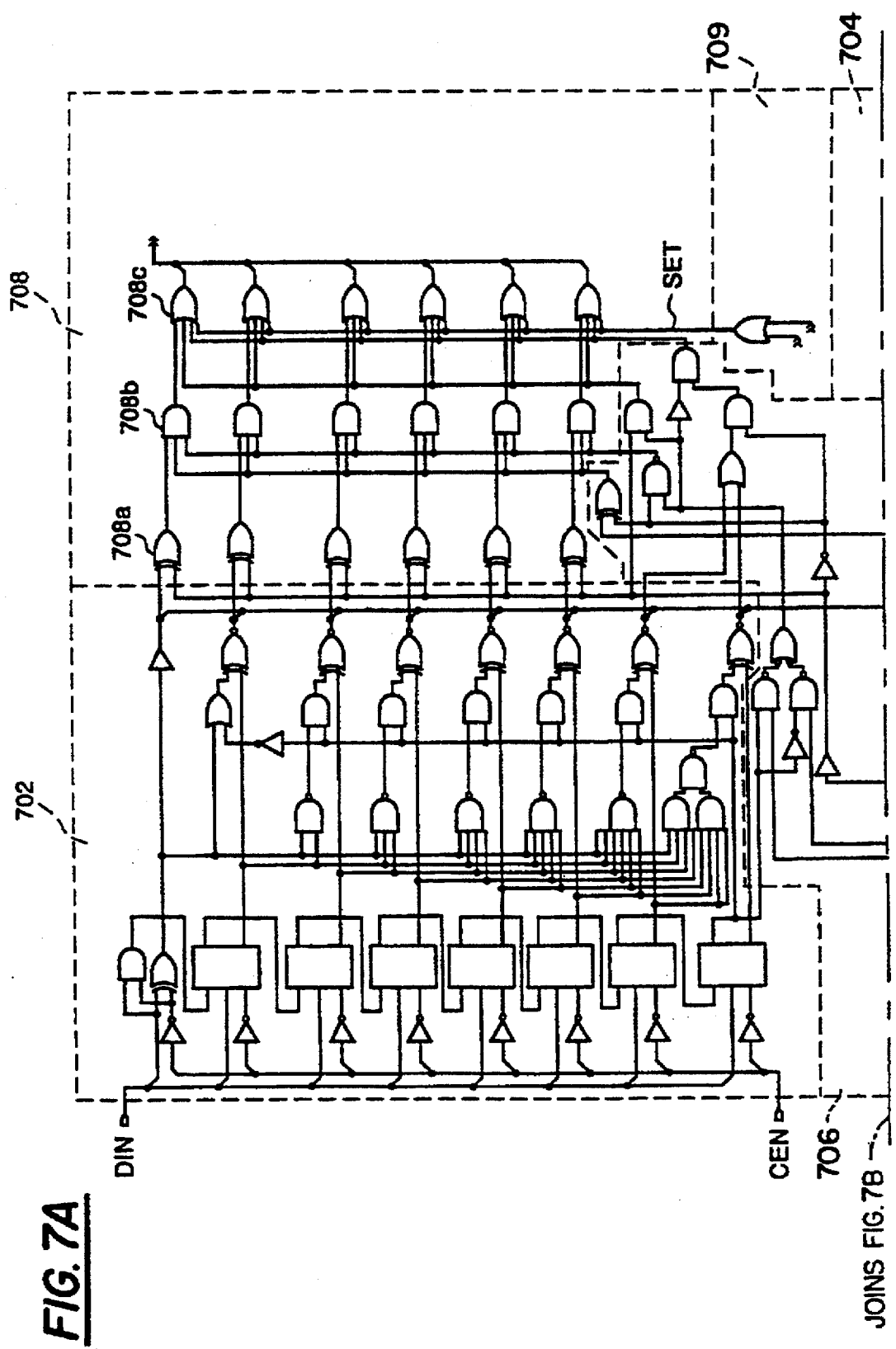
FIGS. 7A and 7B disclose a preferred schematic diagram of the distance measurement circuit of FIG. 6.
Figure 7B:
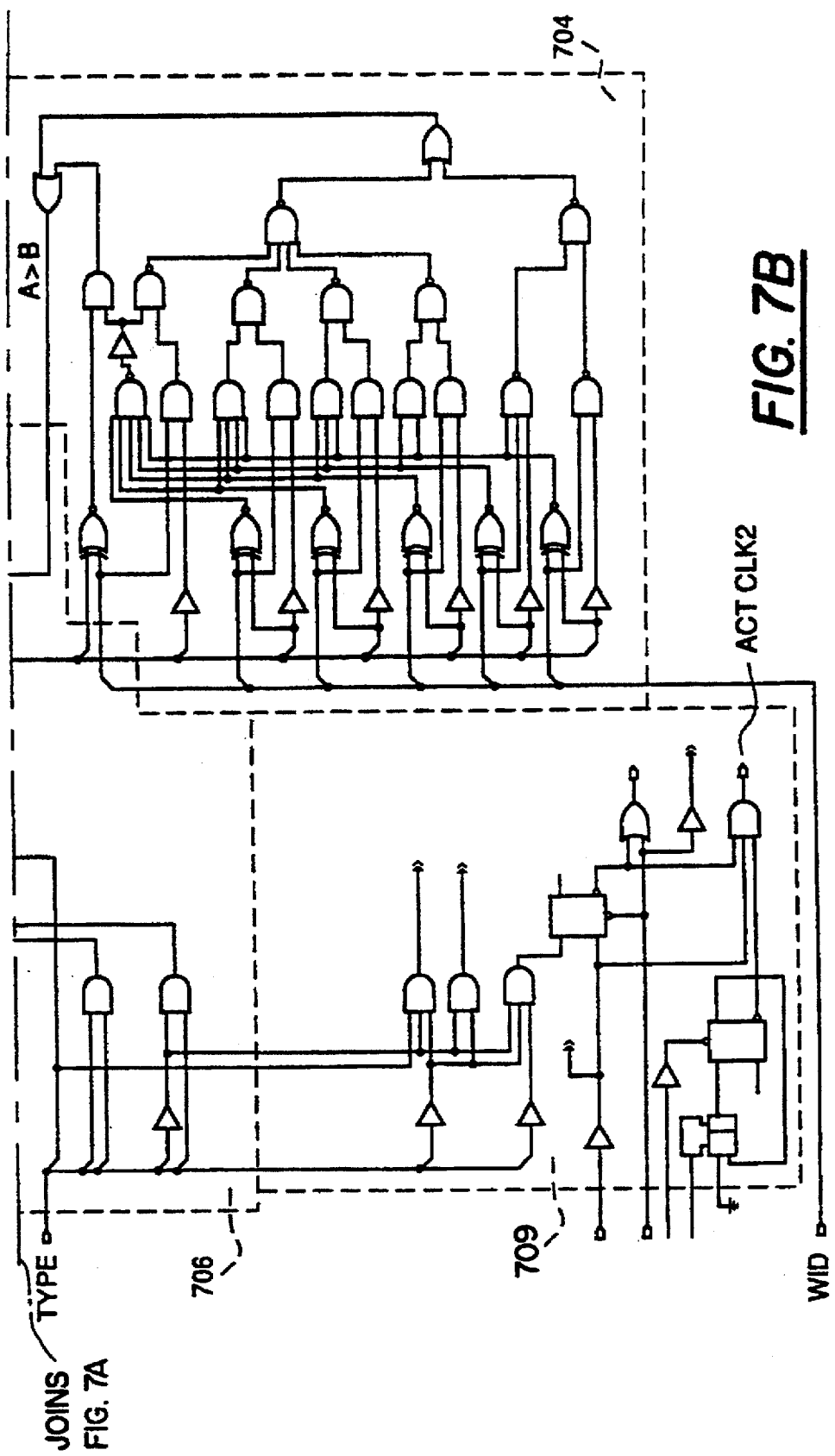

FIG. 7 shows the preferred schematic diagram of the fuzzifier 700 of FIG. 6. The fuzzifier 700 determines the similarity of a crisp input to a selected fuzzy set using the fuzzifying method disclosed with reference to FIGS. 5C–5F. The 8-bit input data (DIN) and center data (CEN) are supplied to a subtractor circuit 702. The subtractor circuit 702 outputs a difference signal (D) representing the distance between the crisp input and the center value. The difference signal (D) from the subtractor 702 is input to a width comparator 704 and compared with the membership function width value (WID). The width comparator 704 compares the difference signal (D) with the width value (WID) and outputs a comparison signal (A>B), and an overflow fit from the subtractor circuit 702. Thus, the control logic circuit 706 receives an overflow bit from the subtractor 702 to determine whether the distance exceeds the maximum possible width of the membership function. According to the preferred embodiment, the maximum width is sixty-three (decimal); thus, the overflow bit output from the subtractor 702 indicates whether the distance from the center to the crisp input exceeds the maximum width.

The control logic circuit 706 outputs control signals to an alpha cut calculator 708 in response to the result of the comparison from the comparator 704, and the configuration signals identifying the membership mode. The alpha cut calculator 708 outputs the fuzzified data from the difference of the subtractor 702 using the following logic: if the crisp data is outside the membership function (e.g., the result of comparison indicates the difference value is greater than the width of the membership function), then the fuzzified value is forced to zero if the polarity bit is not set (e.g., membership function is inclusive or "TRUE"); however, if the polarity bit is set, then the fuzzified value is forced to zero if the crisp data is "inside" the membership function.

In accordance with the fuzzifying method of the present invention, since the membership function has a one-to-one linear slope, the alpha cut calculator 708 takes the complement of the difference value and outputs the result as a similarity value, representing the degree of membership to the fuzzy set. The complement is determined as follows. According to the exemplary membership function presented in FIG. 5C, the maximum width of the membership function is "63" decimal, so that if a crisp input had, for example, a value "CI=7", and a selected membership function had a center location "CL=13" decimal and a width "W=9", then the difference "DIFF=13−7=6" would be complemented to result in a similarity value "COMP(DIFF)=ABS(6−63)=57" decimal. Thus, the similarity value is "57", with the maximum value being "63" if the difference DIFF was zero. As a result, the fuzzifying method of the present invention provides a simple and effective method for similarity determination between a crisp input and a fuzzy set.

The alpha cut calculator 708 includes an invertor circuit 708a, an AND circuit 708b, and an OR circuit 708c, each of which receive the control signals from the control logic circuit 706. The invertor circuit 708a performs a 1's complement inversion of the lowest six bits of the difference signal output from the subtractor 330 in accordance with the inclusive/exclusive bit from the type command signal (TYPE). The AND circuit 708b clears all the bits of the difference value when a "0" is received from the control logic circuit 706, and the OR circuit 708c sets all the bits of the difference value when a "1" is received from the control logic circuit 706.

The alpha cut calculator 708 also sets the term value (T) in response to the type decoder 710. The type decoder 710 outputs a set signal (SET) to the OR gate 708c whenever the type command signal indicates a last term (LT), a last rule (LR), or whenever the system reset signal (RESET) is activated.

Figure 8A:
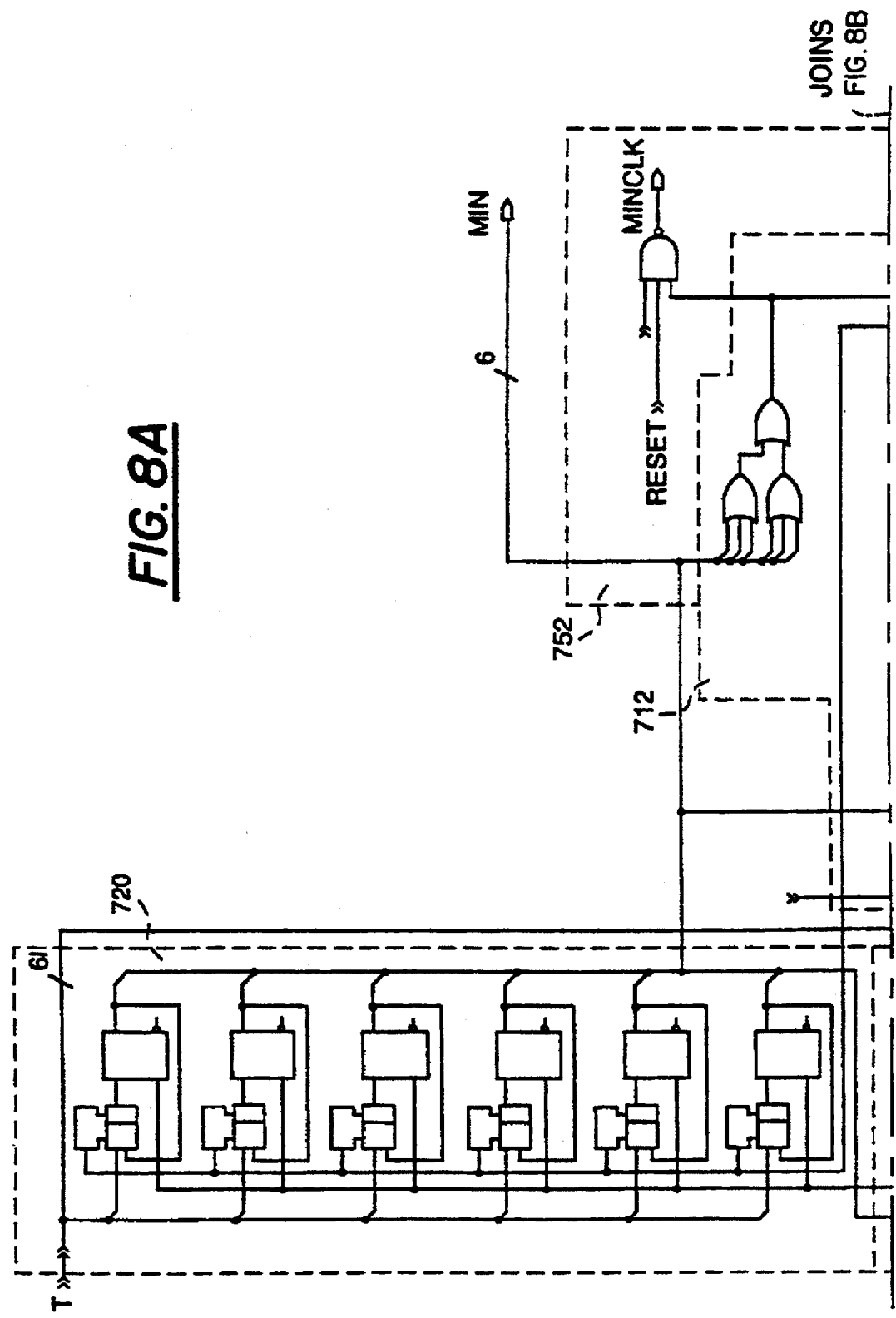
FIGS. 8A and 8B disclose the Max/Min comparator of FIG. 6.
Figure 8B:
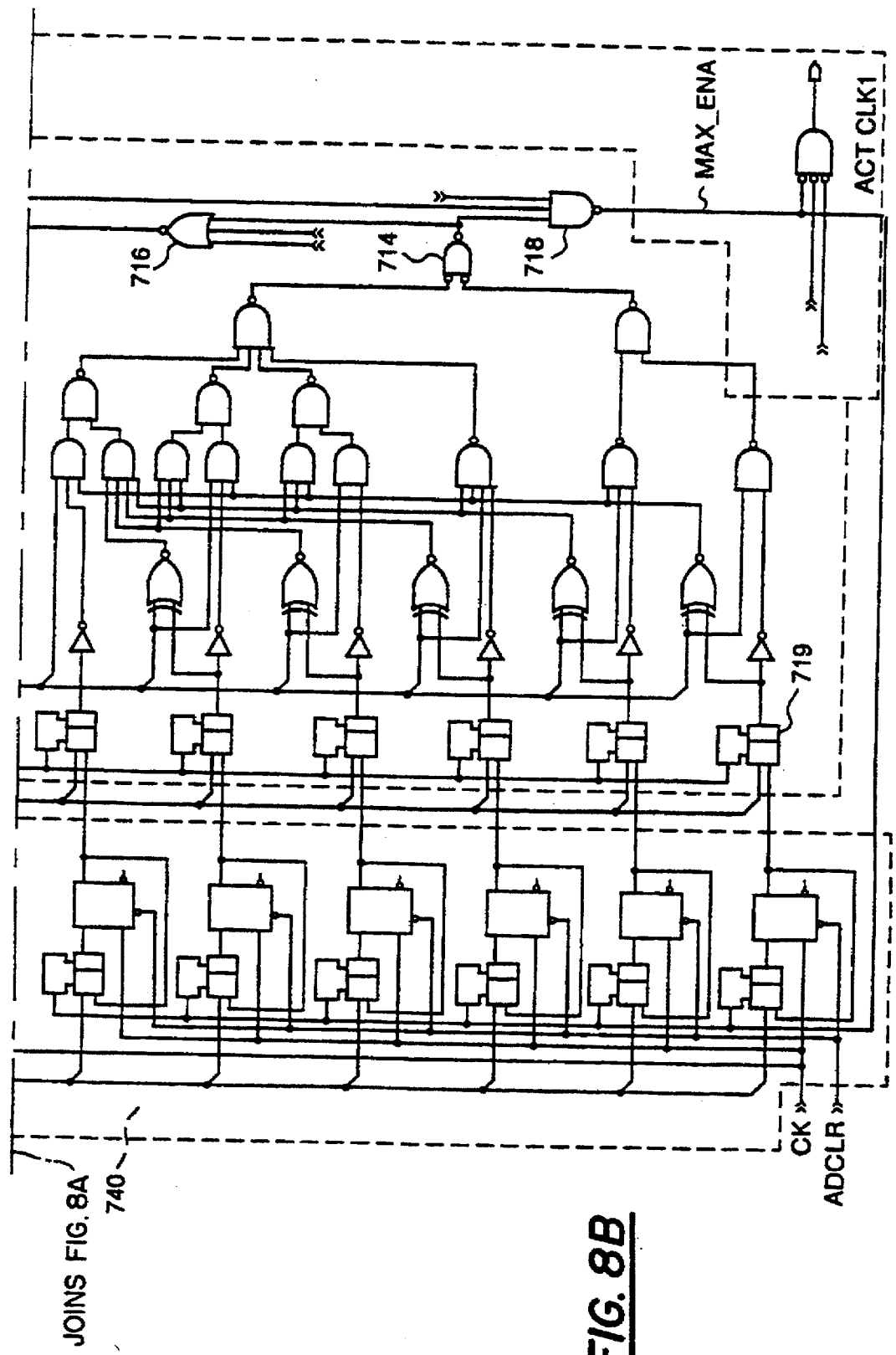

FIG. 8 discloses the Min/Max comparator 705 and a portion of the control circuit 750 of FIG. 6. Although FIG. 6 functionally shows the minimum comparator 710 and the maximum comparator 730 as separate elements for illustration purposes, the two comparator functions are performed by the same Min/Max comparator circuit 712 in order to minimize silicon area on an IC. Similarly, one of ordinary skill in the art will realize that the type decoder 710 and the control circuit portion 752 in combination make up the control circuit 750.

FIG. 8 shows that the fuzzified input term (T) from the fuzzifier 700 and the stored minimum value (MIN) from the minimum register 720 are supplied to the Min/Max comparator 712. The Min/Max comparator circuit 712 compares the fuzzified input term (T) and the stored minimum value (MIN) and outputs a result of comparison. Specifically, the NAND gate 714 outputs a result of comparison to the NOR gate 716 and the NAND gate 718. The NOR gate 716 and the NAND gate 718 output appropriate latch signals to the minimum register 720 and the maximum register 740, in accordance with the LT LR control signal from the type command signal decoder 710. Thus, the NOR gate 716 outputs a minimum enable signal (MIN_ENA) only when the type command signal does not indicate the last term or last rule, when the reset signal is not set, or when the NAND gate 714 indicates that the term value (T) is less than the stored minimum value (MIN) (active low).

Conversely, the NAND gate 718 outputs a maximum enable signal (MAX_ENA) (active low) to the maximum register 740 when the NAND gate 714 outputs a signal indicating that the stored minimum value (MIN) is greater than the stored maximum value, and when the type command signal (TYPE) indicates the last rule is being processed.

The Min/Max comparator 712 includes a series of selectors 719 that select either the fuzzified input term (T) or the stored maximum value from the maximum register 740 in response to the LT LR control signal from the type decoder 710. Thus, the type command signal (TYPE) controls whether the Min/Max comparator 712 operates in a minimum or maximum mode.

The control circuit portion 752 outputs the strobe MIN-CLK in response to the LT LR control signal from the type decoder 710 shown in FIG. 7. The control circuit portion 752 also outputs the clock signal (ACT CLK1) in response to the maximum enable signal (MAX_ENA) from the NAND gate 718. As will be readily apparent to those of ordinary skill in the art, the strobe MINCLK becomes active on every last term or last rule providing that the result of all terms of that rule is greater than 0. The MINCLK signal is used by the fuzzy output processor in order to provide a weighted output average output (discussed in detail below).

The action clock (ACT CLK1) is generated on every last term or last rule provided that the minimum data is greater than or equal to the stored maximum data. Finally, the action clock (ACT CLK2) is generated on every last rule provided that the rule contained at least one action clock signal (ACT CLK1).

Thus, the action signal (ACT CLK1) can be used to identify the latest winning rule in order to restore the relevant action values related to that winning rule. As such, the Min/Max circuit 705 operates as a rule processor to identify the winning rule. Further, the action clock (ACT CLK2) can be used by external logic to latch the action data accessed during the occurrence of the action clock (ACT CLK1).

Finally, the address clear (ADCLR) is generated every last rule, and is utilized to clear the maximum register 740. The address clear (ADCLR) may also be used to clear external memories.

Figure 9:
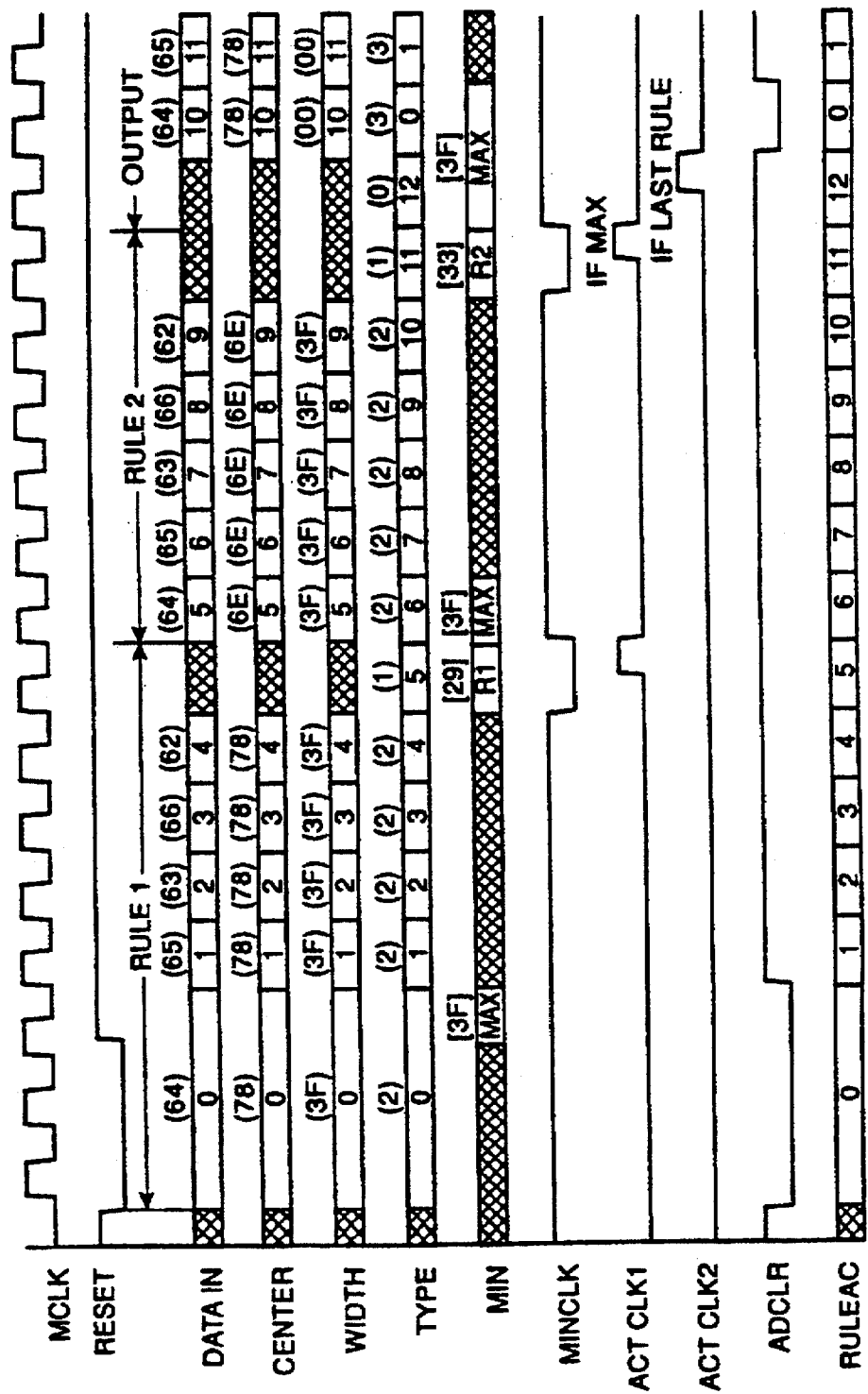
FIG. 9 discloses a timing diagram of the fuzzy input processor of FIG. 6.

FIG. 9 is a timing diagram of the fuzzy input processor 709 shown in FIG. 6. FIG. 9 assumes that there is an external rule address counter for processing each rule of an output. As shown in FIG. 9, when the reset signal (RESET) is active (active low), the address clear (ADCLR) signal becomes active, clearing the rule address counter. The selected data is supplied to the fuzzy input processor 70 when the address clear (ADCLR) signal goes high. Data is clocked in during the rising edge of the master clock (MCLK). Exemplary data values are shown in parentheses as hexadecimal values. During each clock cycle, the fuzzified data is successively compared to the previous data to determine the minimum rule term, namely the crisp input having the farthest distance away from a membership function center. As shown in FIG. 9, the fourth data input (DATA IN) during processing of Rule 1 has a value of 62 hex. When compared with the center value of 78 hex, the hexadecimal difference is 16. When complementing the unsigned difference to six bits, the result is 29 hex.

The minimum value, 29 hex, is compared at the maximum comparator 730 and stored in the maximum register 740 if the value is larger than the previously stored value. Updating the maximum register causes an action clock (ACT CLK1) to be generated. The minimum clock (MINCLK) occurs when the type command signal (TYPE) has a value of 1, indicating the last rule term has been processed. This process continues for all the rules, until the last rule command is issued, in other words, when the type command signal (TYPE) has a value of 0. At that time, the fuzzy input processor 70 outputs the action clock (ACT CLK2) and the address clear (ADCLR), which starts a new cycle.

Figure 10:
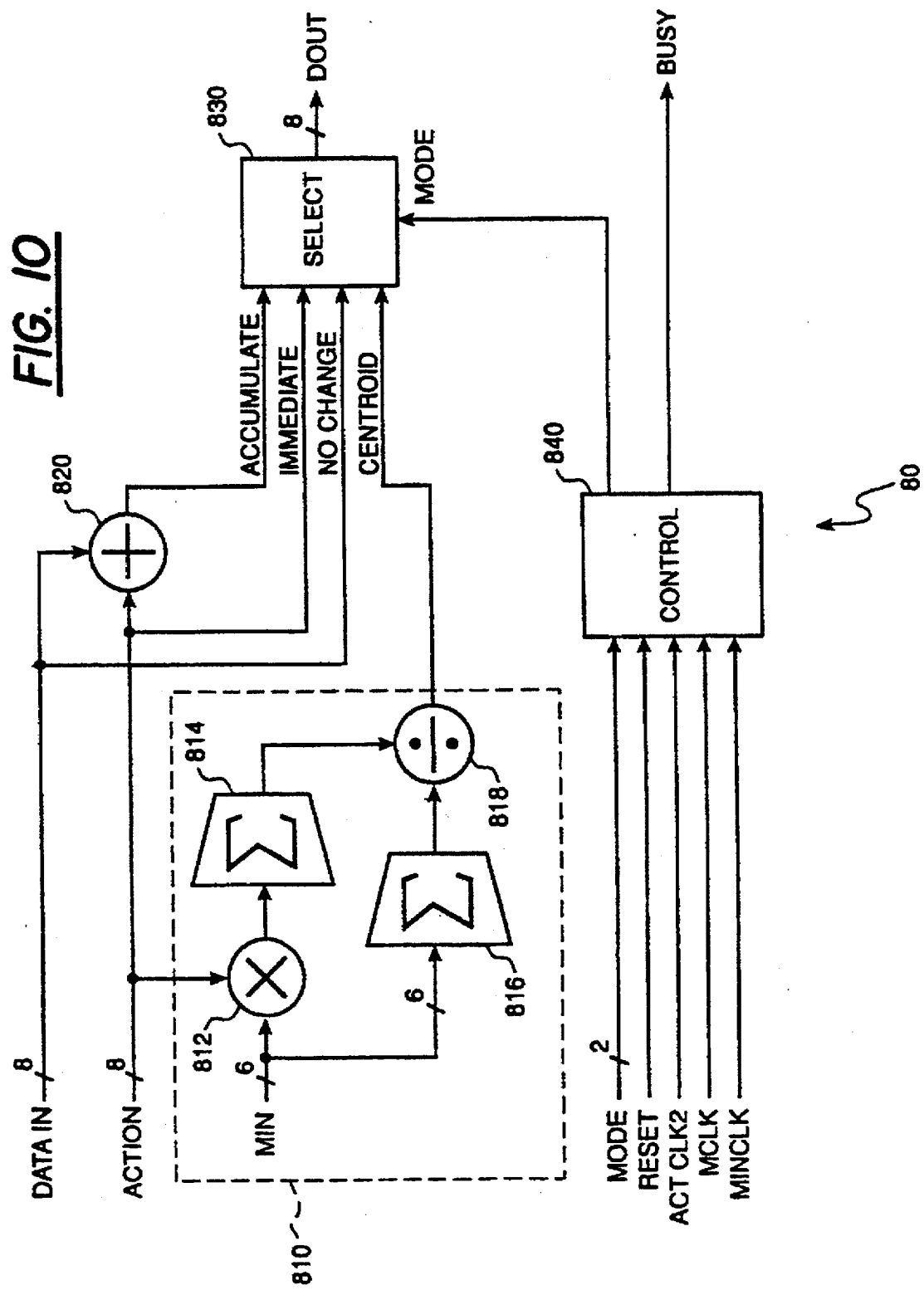
FIG. 10 discloses a block diagram of the fuzzy output processor of FIG. 3.

FIG. 10 discloses a block diagram of the fuzzy output processor 80 of FIG. 3. The fuzzy output processor 80 includes a centroid calculator 810 which calculates a centroid value, also known as a weighted average. The fuzzy output processor 80 also includes an adder 820 to provide an accumulate mode. Specifically, the action value corresponding to a winning rule is added to the previous output, which is supplied to the fuzzy output processor 80 via the DATA IN signal line (see FIG. 3). The signal paths DATA IN and the ACTION signal lines are also directly supplied to a select circuit 830, which selects one of the output modes as the output action value (DOUT) in accordance with a mode signal from a control circuit 840. The mode signal, supplied from the fuzzy memory interface 90 shown in FIG. 3, identifies the output mode for the corresponding winning rule.

The centroid calculator 810 includes a multiplier 812 which receives the 6-bit value signal (MIN) from the fuzzy input processor 70. The multiplier 812 also receives the 8-bit action value and supplies the multiplied result to a summation circuit 814. The minimum value signal (MIN) is also supplied to a summation circuit 816. The summation circuits 814 and 816 output their respective summation results to a dividing circuit 818, which provides the weighted average value, or centroid value, to the select circuit 830.

The Weighted Average mode causes the fuzzy output processor 80 to provide an averaged value of all the actions associated with the winning rules from the Min/Max comparator to be applied to the output action value (DOUT). Thus, the weighted average mode modifies the output by the average of the actions of all rules where a membership was considered valid. Specifically, the weighted average mode implemented by the centroid calculation circuit 810 follows the equation:

$$w = \frac{\sum_{i=1, m_i=0}^{n} m_i * a_i}{\sum_{i=1, m_i=0}^{n} m_i}$$

where W is the average action value or centroid value output to the select circuit 830, n is the number of rules used by an output, $m_i$ is the minimum of terms value (MIN) for rule i, and $a_i$ is the action value (ACTION) assigned to the rule i. The rule mode processor 710 multiplies the minimum of terms value MIN with the corresponding action value ACTION and accumulates the weighted average W until the last rule for a corresponding output is processed, and divides by the accumulated minimum of terms value MIN.

Alternatively, normalization can be performed by dividing the accumulated value $m_i*a_i$ by the number of rules n multiplied by the value "63", which is the height of the membership function. The normalization can also be performed by dividing the accumulated value by "64" by performing a bit shift of the numerator. One will recognize that the resulting error will be negligible.

The number of rules n used by an output and the identity of a last rule for each output is determined by the action clock (ACT CLK2), whereby the control circuit 840 outputs the mode signal (MODE) to the a selector circuit 830.

Figure 11:
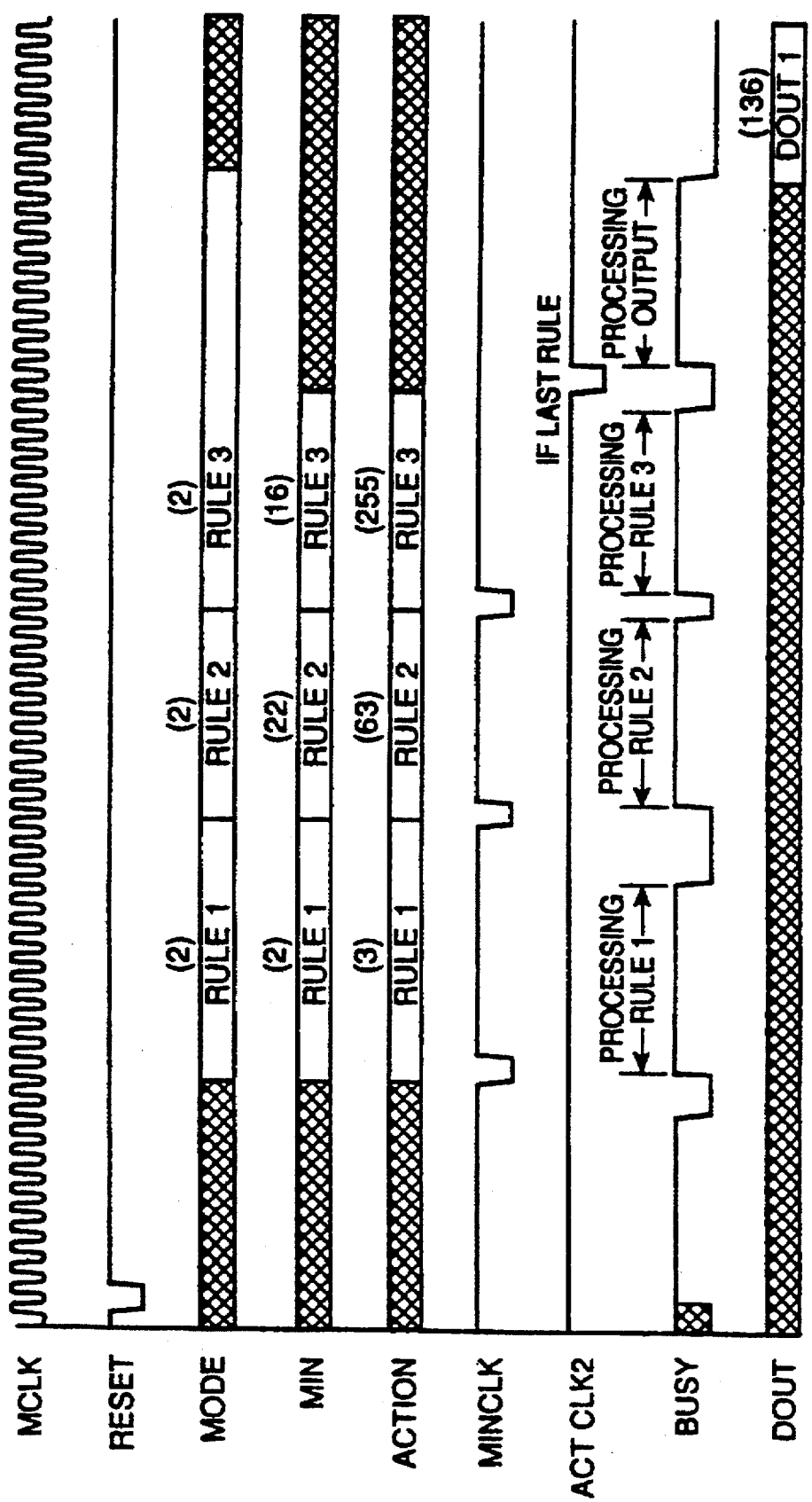
FIG. 11 discloses a timing diagram of the fuzzy output processor of FIG. 10.

The timing for the rule processing will now be described. FIG. 11 shows a timing diagram of the fuzzy output processor 80. The fuzzy output processor 80 processes a rule in response to the MINCLK strobe until the last rule used has been processed, indicated by the action clock (ACT CLK2) going active low. The control circuit 840 of the fuzzy output processor 80 outputs a BUSY signal to inform external circuitry that the fuzzy output processor 80 is busy processing a rule.

Although the outputs of the selector circuit 830 are digital, the output can be modified by adding a D/A converter to the selector circuit 830 or the latches 110 in FIG. 3, in order to provide an analog output signal. Further, the latches 110 in FIG. 3 can be arranged to provide TDM outputs.

Figures 12A, 12B:
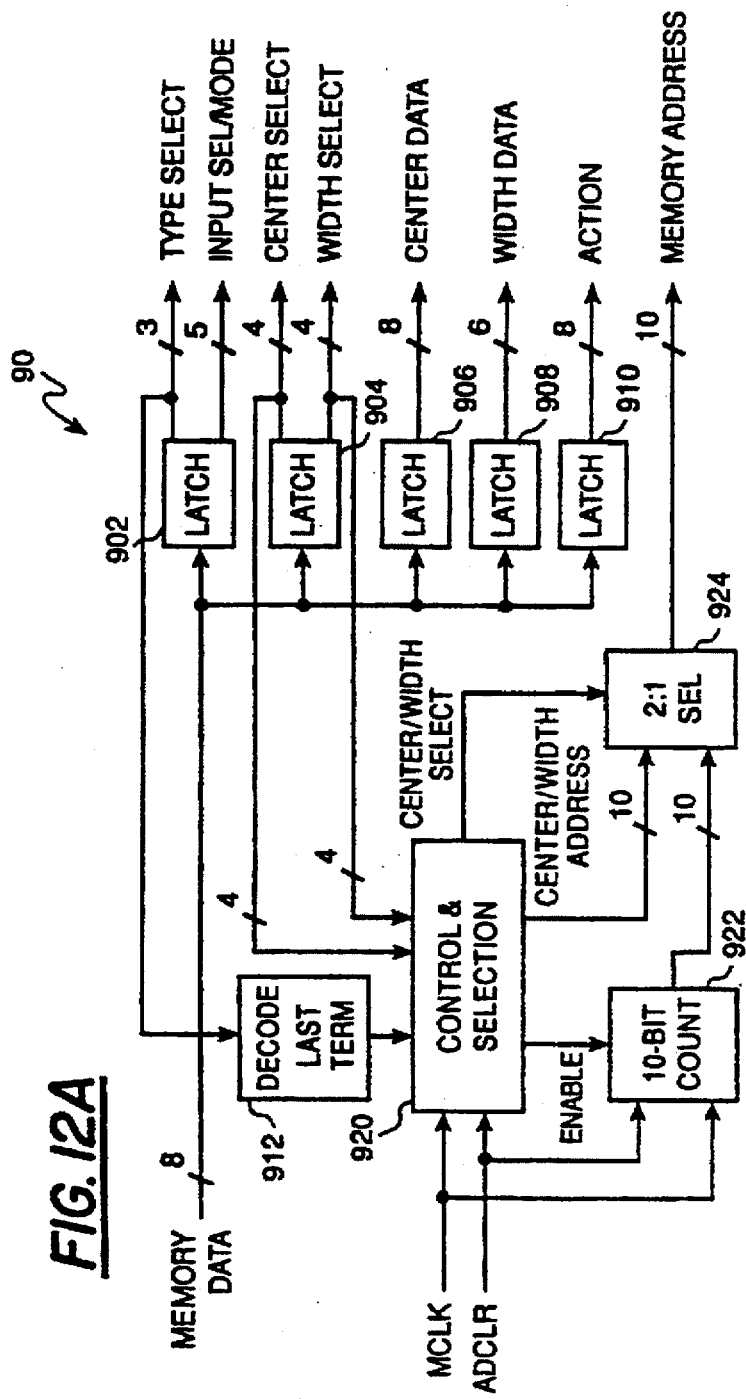
FIG. 12A discloses a block diagram of the fuzzy memory interface of FIG. 3.
FIG. 12B discloses an exemplary memory structure for rule terms processed according to the present invention.

FIG. 12A discloses a block diagram of the fuzzy memory interface 90 of FIG. 3. The fuzzy memory interface 90 receives an 8-bit memory data signal (MEMORY DATA), the master clock signal (MCLK), and the address clear signal (ADCLR) from the fuzzy input processor 70. The memory data signal (MEMORY DATA) represents the configuration data from an external byte wide memory for a rule to be processed. Thus, the memory data signal (MEMORY DATA) is a combination of term, rule and action data.

The byte wide memory 100, shown in FIG. 3, is organized in three sections. These sections are defined as rule/term storage, center storage, and width storage. The memory organization is illustrated in Table 2.

TABLE 2

| DECIMAL ADDRESS | HEX ADDRESS | FUNCTION |
| --- | --- | --- |
| 0 to 991 | 000 to 3DF | Rules |
| 922 to 1007 | 3E0 to 3EF | Centers |
| 1008 to 1023 | 3F0 to 3FF | Widths |

As described previously, rules are organized as groups of one or more term s. FIG. 12B shows the each term is made up of two bytes. The first byte always is stored at an even address, and selects the input and type for the respective term. When the type is the last term, the input select field is used for selecting the defuzzification mode as well. The second byte, which is stored at an odd address, contains the center and width select fields. These fields point to the address having the desired center and width data. When the last type is last term, this byte then contains the action data value, or alternately could contain the address which points to the desired action data.

Therefore, it can be seen that the number of bytes required for any rule is

Bytes per rule=((2X) # of terms)+2.

The last 32 bytes of the addressed external memory are used to store the 16 widths and centers. When used, this data is output on the center and width data buses, and the 4-bit addresses for these parameters are output on the center and width select buses.

Thus, the appropriate address data is loaded into the fuzzy memory interface 90 via the memory data signal line (MEMORY DATA). Specifically, the latch 902 obtains the input select or mode data from the first byte of the rule memory portion of the parameter storage 100. The latch 902 also obtains the 3-bit type select data from the first byte and supplied it to a decoder 912. The latch 904 receives the center select and width select data from the second byte of the rule memory. The latches 906 and 908 receive center data and width data, respectively, addressed from the external memory. As shown in FIG. 3, the center data and width data are supplied to selectors 62 and 64, respectively. Similarly, the latch 910 receives the action data value from the second byte of the rule and outputs the action value to the fuzzy output processor 80.

Address generation for the external memory 100 is performed by the control and selection circuit 920, the 10-bit counter 922, and the 2:1 selector 924.

Figure 13:
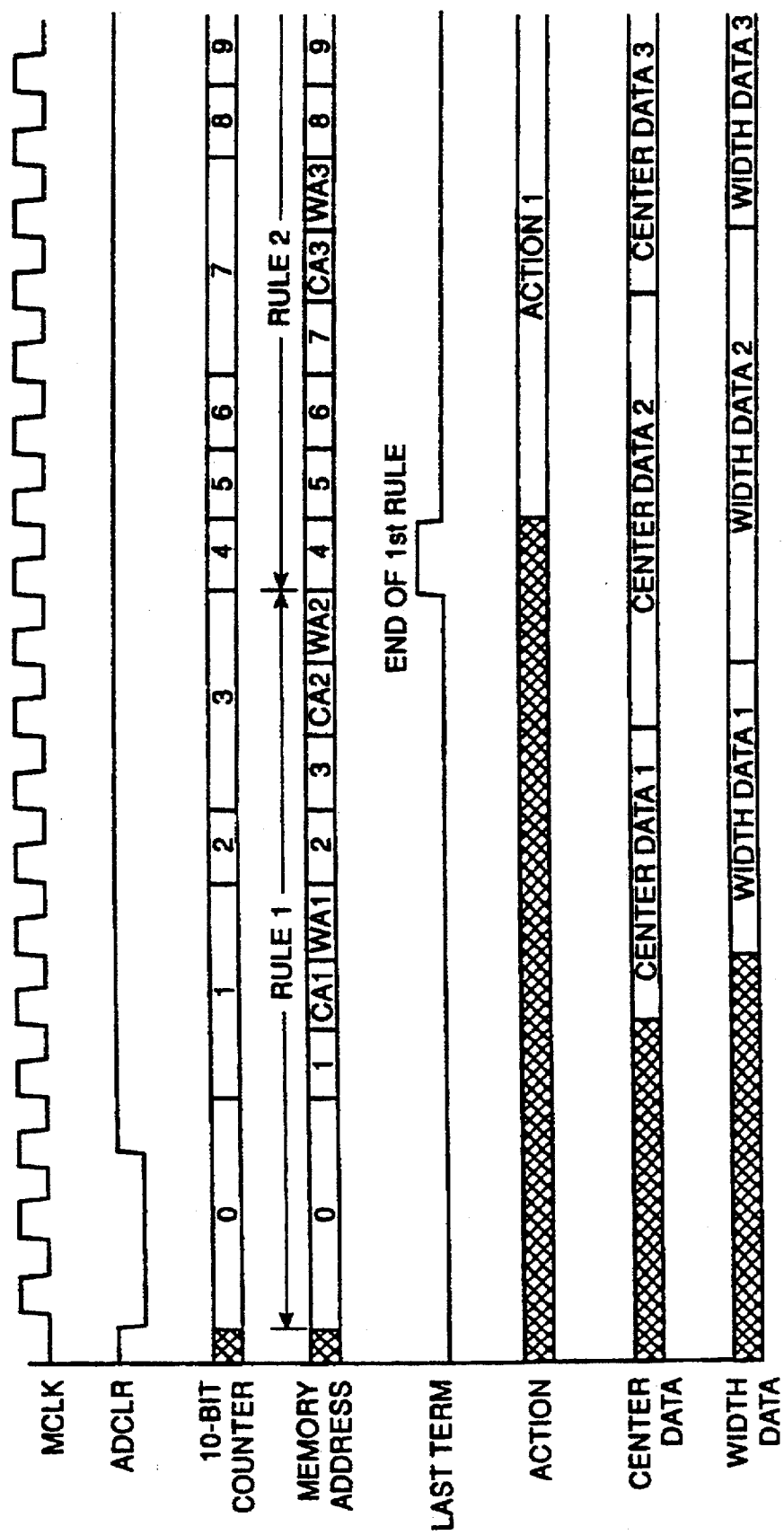
FIG. 13 discloses a timing diagram of the fuzzy memory interface of FIG. 12.

Operation of the fuzzy memory interface 90 will now be described with reference to FIGS. 12A and 13. The initiation is controlled by the address clear signal (ADCLR), whereby all transitions occur after the rising edge of the master clock (MCLK). The first clock causes the type command (TYPE) and input select data (INPUT SEL) to be read from the memory and latched by latch 902. The next clock latches the center and width select data to the latch 904. This address is used by the control selection circuit 920 to retrieve the actual center and width data during the next two clocks, which are thereafter stored in latches 906 and 908, respectively. The fourth clock cycle then repeats until a last term is decoded. This detection causes the action data to be latched in latch 910, and passed on to the fuzzy output processor 80. The first two addresses for the external memory originate from the 10-bit address counter 922 during the first two clocks. The address counter 922 is then disabled from counting for the next two clocks. The addresses during these clocks are created by the control and selection circuit 920 and the center select and width select information is stored in latch 904. When the address clear (ADCLR) signal is asserted, the control and selection circuit 920 resets the counters, and the entire cycle begins again from address 0.

One of ordinary skill in the art would realize that if it is not necessary to loop inputs or outputs back as centers or widths, the selectors 62 and 64 shown in FIG. 3 could be eliminated. In this case, the 8-bit center and 6-bit width data from the fuzzy memory interface 90 would be connected to the fuzzy input processor.

One of ordinary skill in the art would realize that the fuzzy memory interface 90 provides flexibility in the memory configuration of rule term s. However, the fuzzy memory interface could be replaced by other logic controlling the addressing of rule terms to the fuzzy input processor 70 and the fuzzy output processor 80.

The fuzzy microcontroller of the present invention provides efficient control using fuzzy logic, with high processing rates using minimum silicon space. The fuzzy microcontroller also provides an efficient method for compressing input and output data by time division multiplexing. Further, the fuzzy microcontroller provides a fuzzifying arrangement (apparatus and method) which is easy to implement by avoiding the necessity of determining a shape of a membership function. The availability of a floating fuzzifier, whereby a center is defined on the basis of a second input, enables more complex membership functions to be easily implemented. Further, the use of an adjustable width membership function enables a simple implementation of an adaptive fuzzy logic system.

The implementation of the disclosed fuzzy microcontroller for analyzing complex signals will now be described. Specifically, the disclosed embodiment will be described in the application as a crash detector and trigger device for a vehicle airbag.

The field of crash detection typically involves monitoring at least one acceleration sensor to determine the occurrence of a crash. Although one acceleration sensor may be used, a plurality of sensors will provide additional information, especially if mounted at different angles to measure different acceleration vectors, for example for side collisions. Obviously, if a crash detector is unable to detect a crash within a sufficient time, the airbag will not deploy in time to protect the passenger. On the other hand, a false trigger of the airbag may be extremely hazardous to a driver who is startled by the deployment of the airbag. In addition, there have been instances where windows have shattered from the sudden increase in interior air pressure. Thus, the accurate detection of a crash is extremely important for safety reasons.

Figure 14A:
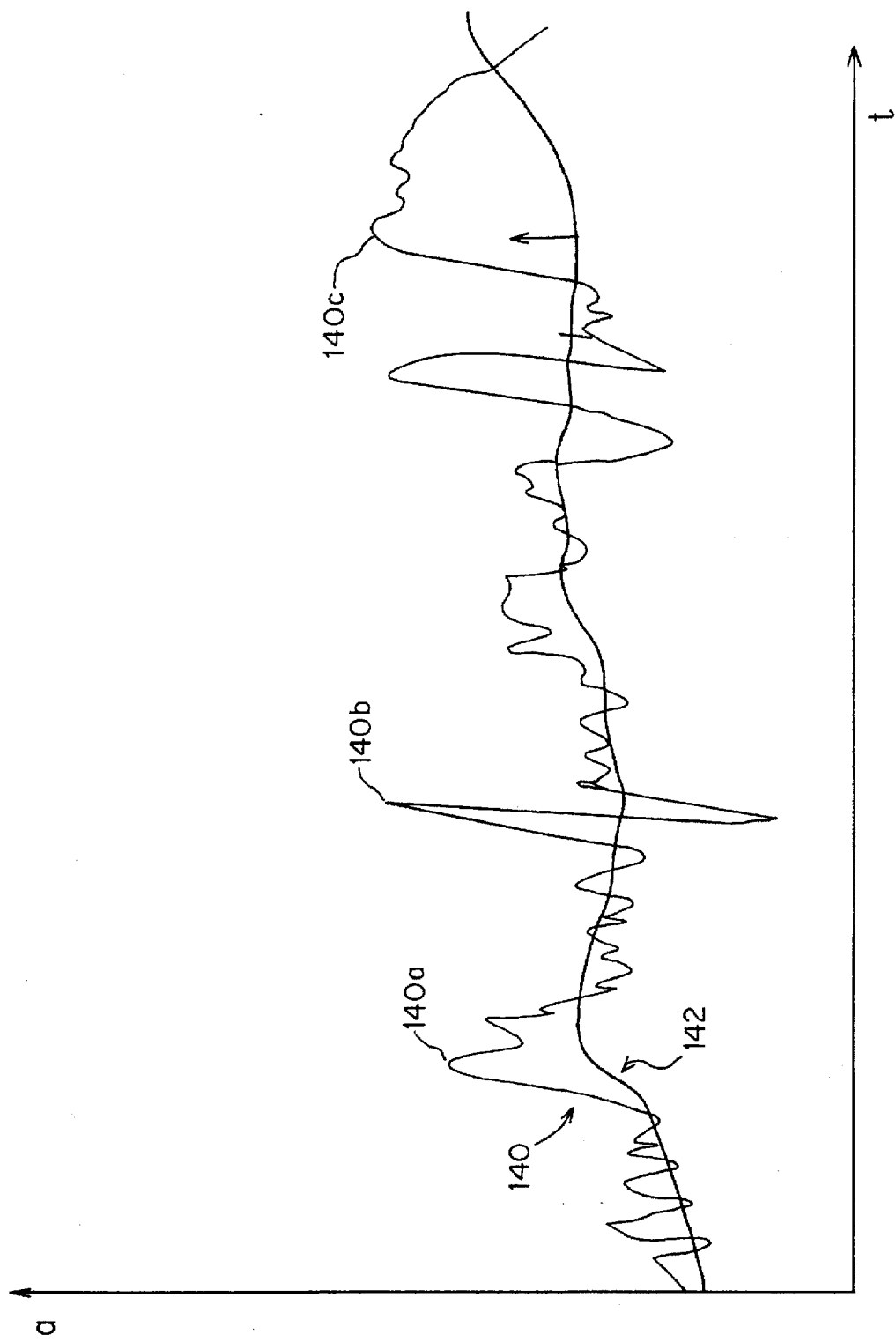
FIGS. 14A and 14B disclose an exemplary acceleration sensor signal for use by the fuzzy microcontroller in FIG. 14B in detecting the occurrence of a vehicle crash in accordance with the present invention.

The inventors have realized that the measurement of a crash event is not accurately based merely on the signal amplitude of the acceleration sensor. For example, FIG. 14A discloses an exemplary acceleration signal 140 from a vehicle traveling over a bumpy road. Reference numeral 142 represents the average, or low pass-filtered, signal level of the acceleration signal 140, and numerals 140a and 140b and 140c represent portions of the acceleration signal 140 at certain events. For example, reference numeral 140a represents a heavy braking action by the driver; reference numeral 140b represents the vehicle hitting a pothole; and reference numeral 140c represents a vehicle crash. The braking portion 140a and the pothole portion 140b of the acceleration signal 140 illustrate that the acceleration sensor may have substantial changes in amplitude during typical driving conditions, such that mere amplitude monitoring is insufficient. Further, Fourier analysis is ineffective because the acceleration signal 140 is essentially unpredictable, as opposed to a repeating signal, and because the processing delays in Fourier analysis are either too slow or too expensive.

In addition, pattern comparators are not effective because the time-variable signal is constantly changing, thereby eliminating any frame of reference.

The inventors have realized that an accurate and low-cost crash detection system may be developed by using the dynamic and adaptive membership functions having floating inputs. Specifically, the crash detection system is preferably based on accumulated energy reaching a dynamic threshold. The accumulated energy is determined on the basis of the acceleration sensor signal and membership functions having different floating centers. Specifically, the accumulated energy is determined on the basis of a calculated "average-level" signal, and the different relationships of the acceleration sensor signal to the average-level signal.

Figure 14B:
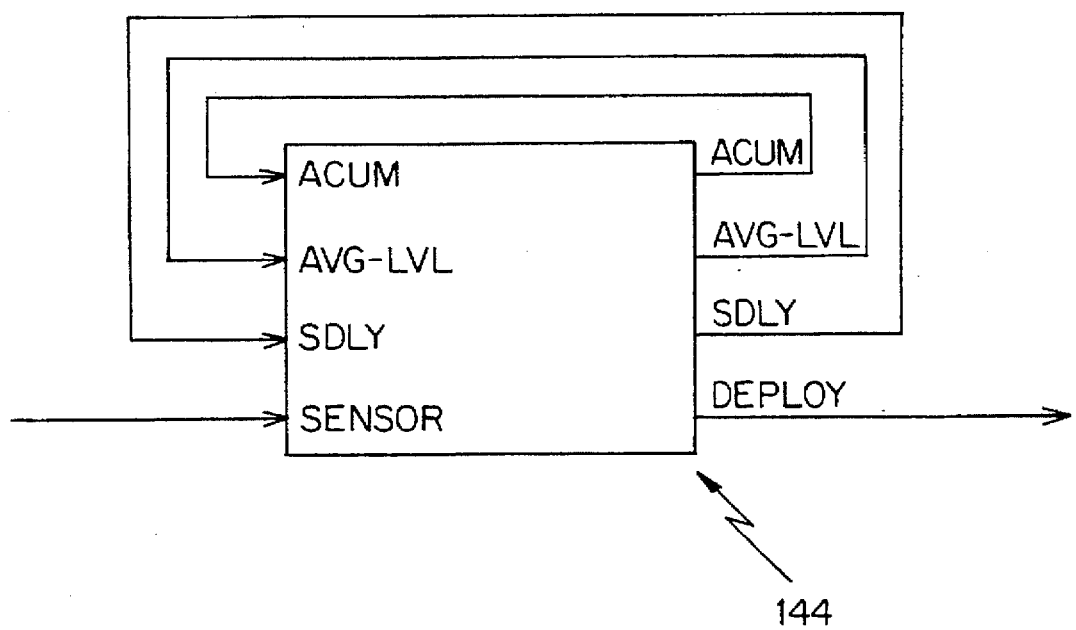

FIG. 14B illustrates the inputs and outputs of a fuzzy microcontroller 144 of the preferred embodiment corresponding to the fuzzy processor system 50 in FIG. 3 and performing the signal processing tasks related to vehicle crash detection. The fuzzy microcontroller 144 receives an acceleration sensor signal "SENSOR" for processing. The fuzzy microcontroller 144 outputs four signals, three of which are used as feedback inputs. As explained in detail below, the output "ACUM" is modified on the basis of executed rules, and is used as a crisp input to determine whether deployment of the airbag is necessary with the trigger signal "DEPLOY", indicating detection of a vehicle crash. The output "AVG-LVL" is used as a floating center, and is adjusted by the executed rules. The output "SDLY" is a time-shifted version of the input "SENSOR", and is used as a floating center. The output "DEPLOY" is the trigger signal for the airbag activation circuit.

The fuzzy microcontroller 144 outputs an average-level signal (AVG-LVL), also referred to as a low-pass signal, to eliminate variations in the sensor due to time of day, etc., and to eliminate the high-frequency components caused by a bumpy road. The average-level signal (AVG-LVL) is used as a floating center for a first set of membership functions that dynamically track the acceleration sensor to the average-level signal. Thus, the average-level signal is able to dynamically adjust itself using floating membership functions.

The accumulated energy signal (ACUM) is output by the fuzzy microcontroller 144 shown in FIG. 14B on the basis that a crash requires an energy buildup to a level corresponding to the average-level signal within a predetermined period. Thus, the accumulated energy signal (ACUM) is adjusted on the basis of: (1) the acceleration sensor deviation from the average-level signal; (2) whether the acceleration sensor signal (SENSOR) is greater than or less than the average-level signal; and (3) whether the acceleration sensor signal is positive or negative relative to the prior sample of the acceleration sensor signal (SDLY), i.e., whether the derivative of the acceleration sensor signal over a processing interval is positive or negative. In addition, the accumulated energy signal is automatically decremented if there acceleration so activity if the acceleration sensor signal within a predetermined time.

As a result, the fuzzy microcontroller tracks average acceleration, instantaneous energy, and accumulated energy to determine whether the airbag should be deployed.

Figure 15A:
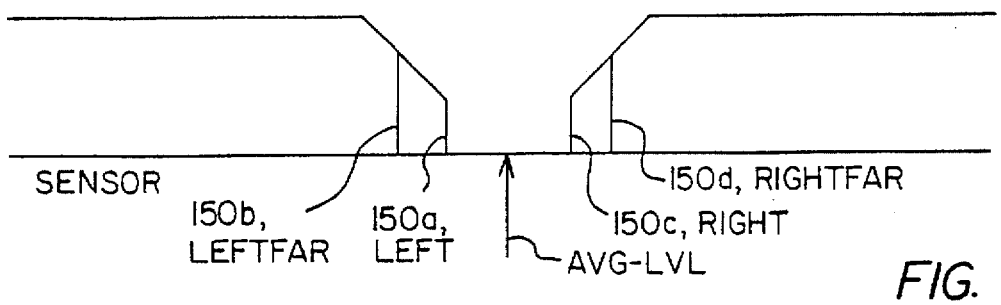
FIGS. 15A–E illustrate exemplary membership functions for signal processing functions related to vehicle crash detection using the fuzzy microcontroller of the present invention.

FIGS. 15A–E disclose membership functions used to determine each of the outputs of the fuzzy microcontroller related to an airbag trigger device. For example, FIG. 15A discloses a group of membership functions having a common floating center (AVG-LVL) to dynamically adjust the average level signal (AVG-LVL) based upon the input signal SENSOR. Specifically, FIG. 15A shows a right-exclusive membership function 150a entitled "LEFT" having a width of, for example, "30"; another right-exclusive membership function 150b entitled "LEFTFAR" having an exemplary width of "40"; and left-exclusive membership functions 150c and 150d entitled "RIGHT" and "RIGHTFAR" and having widths of "30" and "40", respectively.

The output AVG-LVL is initialized to equal the sensor value. As shown in FIG. 15A, the acceleration sensor input "SENSOR" has an effective empty band having a width of "30", whereby the sensor input does not fit into any membership function. Thus, the empty band operates as a noise filter for minor fluctuations in the sensor signal. However, if the acceleration sensor input "SENSOR" exceeds the empty band, the crisp input "SENSOR" falls into one of the membership functions "LEFT" 150a or "RIGHT" 150c; if the acceleration input "SENSOR" exceeds further, it eventually reaches one of the membership functions "LEFTFAR" 150b or "RIGHTFAR" 150d. The output signal "AVG-LVL" representing the averaged value of the acceleration sensor, is determined on the basis of the rules in TABLE 3.

TABLE 3

AVG - LVL OUTPUT RULES

If AVG-LVL is ZERO than AVG-LVL = SENSOR
If SENSOR is RIGHT then AVG-LVL = AVG-LVL + 1
If SENSOR is LEFT then AVG-LVL = AVG-LVL − 1
If SENSOR is RIGHTFAR then AVG-LVL = AVG-LVL + 2
If SENSOR is LEFTFAR then AVG-LVL = AVG-LVL − 2

As shown in the above Table 3, the average-level signal "AVG-LVL" is dynamically adjusted on the basis of the deviation of the sensor input "SENSOR" from the floating center "AVG-LVL" of the membership functions. In addition, the fuzzy microcontroller of the preferred embodiment has a processing cycle time of 10 kHz, which effectively limits the frequency response of the output to less than 5 kHz. Thus, the membership functions disclosed in FIG. 15A serve as a low pass filter, whereby the larger the width of the membership function resulting in a larger empty band, the lower the cutoff frequency of the fuzzy filter, with the filter cutoff dependent on the action values as shown in Table 3. The logical inverse of the membership functions in FIG. 15A would result in a high-pass filter.

The crisp input, "SENSOR" is compared to these membership functions in the order of 150a, 150c, 150b, 150d to determine a match, whereby the first membership function that identifies a match is deemed the winning membership function. This ordering of membership functions is discussed in more detail with respect to FIG. 15D.

Figure 15B:
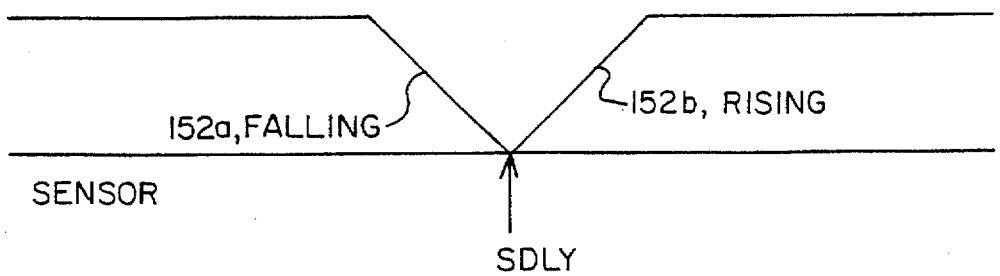

FIG. 15B discloses membership functions 152a and 152b for use in calculating the accumulated energy of the acceleration sensor signal. The membership functions have a common floating center "SDLY", that is a feedback input representing an acceleration sensor value delayed by one processing cycle of 0.1 milliseconds. In other words, the rule for the output "SDLY" is SDLY=SENSOR. The membership functions 152a and 152b are right-exclusive and left-exclusive membership functions entitled "FALLING" and "RISING", respectively, each having a width of "0". As shown in FIG. 15B, the crisp input "SENSOR" is compared with a dynamic center representing a time-delayed value of the acceleration sensor signal; as such, the membership functions in FIG. 15B effectively calculate the derivative d(SENSOR)/dt. According to the preferred embodiment, only the sign of the derivative is of concern, whereby the membership function "RISING" indicates a positive derivative, and the membership function "FALLING" indicates a negative derivative. However, a series of membership functions may be established, as shown in FIG. 15D below, to calculate ranges of change for the derivative of the input signal.

Figure 15C:
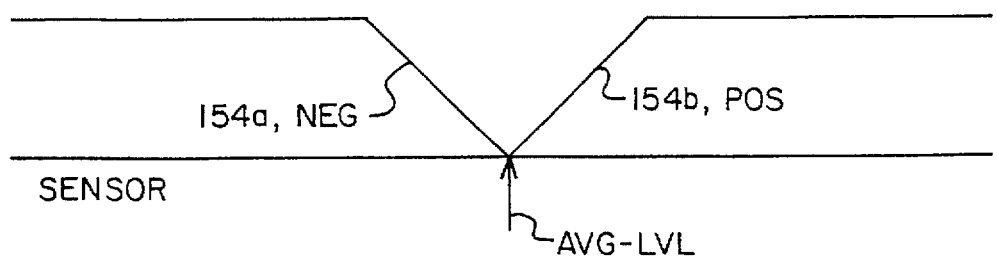

FIG. 15C discloses membership functions "NEG" 154a and "POS" 154b having the feedback signal "AVG-LVL" as a floating center and a width of "0". The membership functions "NEG" 154a and "POS" 154b are right-exclusive and left-exclusive membership functions, respectively. As shown below, the membership functions "NEG" 154a and "POS" 154b are used to determine if the acceleration sensor input "SENSOR" is greater than or less than the acceleration sensor input.

Figure 15D:
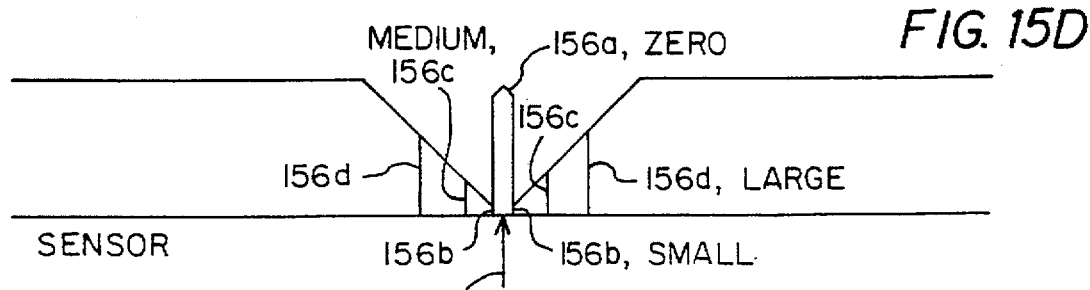

FIG. 15D discloses the symmetric inclusive membership function "ZERO" 156a and the symmetric exclusive membership functions "SMALL" 156b, "MEDIUM" 156c, and "LARGE" 156d. The membership function "ZERO" 156a has an exemplary width of "4", and the exclusive membership functions "SMALL" 156b, "MEDIUM" 156c, and "LARGE" 156d have widths "4", "12", and "28", respectively. Similar to the membership functions 150, the membership functions 156 determine the deviation of the acceleration signal "SENSOR" from the floating center "AVG-LVL", except that the inclusive membership function "ZERO" 156a provides a nominal range of tolerable variations in the acceleration sensor signal. When combined with the membership functions 154 in FIG. 15C, the membership functions 156 provide a technique for dynamically determining the deviation ("SMALL", "MEDIUM", or "LARGE") of the acceleration sensor signal "SIGNAL" from the average level signal "AVG-LVL", as well as the direction of the deviation ("NEG" or "POS").

When processing multiple membership functions as shown in FIG. 15D, the exclusive membership functions are ordered on the basis of the corresponding widths, starting with the largest-width membership functions, such that the first membership function that receives the crisp input is designated the winning membership function. For example, assuming the membership functions in FIG. 15D processed a crisp sensor input ("SENSOR") having a crisp value of "35" above the center value, the crisp sensor should belong to the "LARGE" 156d membership function. If, however, the membership functions "MEDIUM" 156c or "SMALL" 156b were first processed, the resulting membership function designation would be incorrect. Therefore, the processing of exclusive membership functions is arranged in the order starting with the largest-width membership functions and ending with the smallest-width membership functions.

The membership functions disclosed in FIGS. 15B, 15C, and 15D are used as rule terms for the rules associated with the accumulated energy output "ACUM" as defined in Table 4:

TABLE 4

| | |
|---|---|
| If SENSOR is ZERO and SDLY is ZERO | then ACUM = ACUM − 1 |
| If SENSOR is LARGE and SENSOR is RISING and SENSOR is POS | then ACUM = ACUM + 5 |
| If SENSOR is MEDIUM and SENSOR is RISING and SENSOR is POS | then ACUM = ACUM + 4 |
| If SENSOR is SMALL and SENSOR is RISING and SENSOR is POS | then ACUM = ACUM + 3 |
| If SENSOR is LARGE and SENSOR is FALLING and SENSOR is NEG | then ACUM = ACUM − 5 |
| If SENSOR is MEDIUM and SENSOR is FALLING and SENSOR is NEG | then ACUM = ACUM − 4 |
| if SENSOR is SMALL and SENSOR is FALLING and SENSOR is NEG | then ACUM = ACUM − 3 |
| If SENSOR is LARGE and SENSOR is FALLING and SENSOR is POS | then ACUM = ACUM + 3 |
| If SENSOR is MEDIUM and SENSOR is FALLING and SENSOR is POS | then ACUM = ACUM + 2 |
| If SENSOR is SMALL and SENSOR is FALLING and SENSOR is POS | then ACUM = ACUM + 1 |
| If SENSOR is LARGE and SENSOR is RISING and SENSOR is NEG | then ACUM = ACUM − 3 |
| If SENSOR is MEDIUM and SENSOR is RISING and SENSOR is NEG | then ACUM = ACUM − 2 |

Figure 15E:
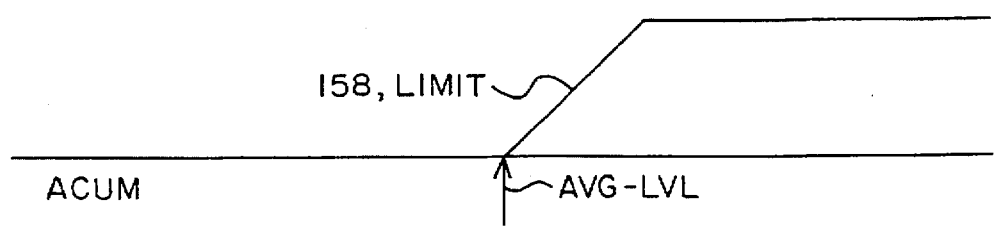

FIG. 15E shows the membership function "LIMIT" 158 that compares the accumulated energy value "ACUM" to the average acceleration value "AVG-LVL": if the accumulated energy value is within the "LIMIT" 158, the fuzzy microcontroller outputs the deploy signal "DEPLOY" signal to the airbag trigger mechanism according to the rule "IF ACUM is LIMIT then DEPOLY=255".

As shown above in Table 4 and FIG. 15E, the deployment of the airbag is based upon the accumulated energy value "ACUM" reaching the average level of the acceleration signal "AVG-LVL". The calculation of the accumulated energy is based upon the magnitude of change in the acceleration sensor "SENSOR" relative to the average "AVG-LVL", the direction of the change relative to the average "AVG-LVL", and the direction of the change relative to the prior acceleration signal "SDLY" (e.g., the sign of the derivative d(SIGNAL)/dt).

For example, if the second rule entry of Table 4 is executed, the state of the acceleration sensor is a substantial increase in the value of the acceleration signal "SENSOR", resulting in an increase in accumulated energy. If, however, the fifth entry of Table 4 is executed, the state of the acceleration signal is a substantial decrease in the signal "SENSOR", for example due to recovery from a pot-hole impact, causing a corresponding reduction in the accumulated energy. The eighth entry of Table 4 suggests that while the acceleration signal "SENSOR" is less than the prior sensor value "SDLY", there is still an increased acceleration above the average acceleration "AVG-LVL" creating the accumulation of energy.

The first rule entry of Table 4 refers to a rule term "SDLY is ZERO", which is the same as the membership function "ZERO" 156a, whereby if the feedback input "SDLY" is within a symmetric inclusive membership function have a width "4" and the floating center "AVG-LVL", then the acceleration has remained constant. Thus, the first rule entry describes the condition where the acceleration sensor signal "SENSOR" has not changed from its prior sample value and is near to the average level of the signal "AVG-LVL", suggesting a steady state condition; in such a case, the rule acts as a counter to decrement the accumulated energy signal. However, if the sensor continually has an increased or sustained acceleration above the average acceleration "AVG-LVL", the accumulated energy will reach a limit corresponding to the average acceleration and deploy the airbag. A scaling factor between the accumulated energy "ACUM" and the average acceleration "AVG-LVL" is provided by the value of the action values adjusting the value "ACUM" in Table 4.

According to the present invention, the method of fuzzifying a crisp input may be easily implemented in an IC chip by determining the distance between the crisp input and the center 9f the respective membership function; if the distance is less than the width of the membership function, then the distance value is complemented to determined the alpha cut, or the membership value of the crisp input with respect to that fuzzy set. Since the shape of the membership function for the fuzzy set need not be determined, the fuzzifying method of the present invention can be easily implemented, which results in substantial cost savings in design development and circuit implementation.

Although the present invention is preferably implemented on an IC chip, one having ordinary skill in the art will appreciate that the above-disclosed techniques may also be performed in a software-controlled computer, for example to perform simulations before reduction to silicon.

In addition, the fuzzy input processors of the present invention can be implemented in a cascaded arrangement, in order to provide greater processing capacity for a larger number of inputs, outputs, or both. Those skilled in the art will realize the technique of controlling a plurality of the fuzzy input processors in such a cascaded arrangement.

Those skilled in the art of fuzzy logic will also appreciate that the programmable rule base for an output can include, but not be limited to have any number of rules, any number of terms in a rule, the use of any or all logical functions as sentence connective operators, a permanent or volatile rule memory with on-chip or external rule storage.

Further, the rule base can have various configurations and include address pointers rather than data values to optimize rule memory storage capacity and flexibility.

Further, those skilled in the art will recognize in view of the foregoing that the fuzzy microcontroller of the present invention can be modified with different membership functions to provide high-pass circuits, low-pass circuits, or circuits that calculate the derivative or integral of a signal using fuzzy membership functions. As such, the disclosed invention is particularly effective in numerous signal processing applications, including, but not limited to vibration analysis, medical patient-monitoring equipment, system loop tracking controls, and the like.

In addition, those skilled in the art will appreciate that the disclosed embodiment can be applied to different applications involving other types of impacts (such as shattered glass), or applications requiring signal energy measurement, for example to measure acoustic, seismic, or radiant energy, or to monitor electric power distribution grids.

Finally, those skilled in the art of fuzzy logic will appreciate that techniques for the determination of an optimum output, also known as "defuzzification", include but are not limited to defuzzification by the Mean of Maximum method, the Maximum method, the Center of Area or Center of Gravity methods, or equivalent methods thereof.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for detecting a vehicle crash in response to an acceleration sensor signal, comprising:

first means for outputting an average value signal corresponding to an average value of said acceleration sensor signal, said first means adjusting said average value signal on the basis of a first relationship between said acceleration sensor signal and a first group of membership functions, said first group of membership functions each having a center corresponding to said average value signal;

second means for determining a change in said acceleration sensor signal on the basis of a second relationship between said acceleration sensor signal and a second group of membership functions;

third means for determining a deviation in said acceleration sensor signal from said average value signal on the basis of a third relationship between said acceleration sensor signal and a third group of membership functions each having a center corresponding to said average value signal;

fourth means for outputting an accumulated energy signal generated on the basis of a winning rule from a set of rules, each of said rules having rule terms corresponding to at least one of said membership functions of said first, second and third membership functions, said fourth means comprising means for determining said winning rule on the basis of said second and third relationships; and fifth means for outputting a crash detection signal on the basis of a comparison between said accumulated energy signal and said average value signal.

2. An apparatus as recited in claim 1, wherein said second group of membership functions each have a center corresponding to a time-delayed value of said acceleration sensor signal.

3. An apparatus as recited in claim 2, wherein the membership functions of said first, second, and third membership functions are constant-slope membership functions.

4. An apparatus as recited in claim 3, further comprising means for calculating said corresponding relationship between said acceleration sensor input and said respective centers of said constant-slope membership functions, said calculating means comprising:
   a subtractor for outputting a distance signal corresponding to a distance between said acceleration sensor input and said corresponding center of said respective membership function;
   means for linearly complementing said distance signal; and
   means for selectively truncating said distance signal on the basis of said corresponding width of said respective membership function.

5. An apparatus as recited in claim 2, wherein said second means comprises means for calculating a derivative of said acceleration sensor signal on the basis of said second relationship to said second group of membership functions.

6. An apparatus as recited in claim 1, further comprising:
   an input processor for comparing said acceleration sensor signal with said membership functions in accordance with said set of rules to obtain a fuzzified acceleration sensor signal identifying said first, second and third relationships, said winning rule being determined by said fourth means on the basis of said fuzzified acceleration sensor signal; and
   an output processor for adjusting said accumulated energy signal in accordance with said winning rule.

7. An apparatus as recited in claim 6, wherein said third group of membership functions comprise membership functions measuring small, medium, and large deviations of said acceleration sensor signal from said average level signal.

8. An apparatus as recited in claim 6, wherein said input processor comprises means for assigning an input signal as a center of a selected membership function, said assigning means assigning said average value signal as a center for said first and third group of membership functions and a time-delayed value of said acceleration sensor signal as a center for said second group of membership functions.

9. An apparatus as recited in claim 8, wherein said fifth means performs said comparison between said accumulated energy signal and said average value in accordance with a trigger membership function having assigned by said assigning means said average level signal as a center.

10. An apparatus as recited in claim 9, wherein said fourth means comprises a timer for decrementing said accumulated energy signal on the basis of no change between said average value signal and said acceleration sensor signal within a predetermined interval.

11. An apparatus as recited in claim 1, wherein said crash detection signal is output as a trigger for an airbag deployment device.

12. A fuzzy signal processor for measuring accumulated energy from an acceleration sensor signal, comprising:
   a fuzzy low-pass filter for outputting a filtered acceleration sensor signal, said fuzzy low-pass filter comprising a first group of membership functions having said filtered acceleration sensor signal as an assigned center;
   a fuzzy calculator for determining a change in said acceleration sensor signal with respect to time, said change being calculated on the basis of a second group of membership functions having a time-delayed value of said acceleration sensor signal as an assigned center;
   a fuzzy comparator for calculating a deviation in said acceleration sensor signal from said filtered acceleration sensor signal on the basis of a third group of membership functions having said filtered acceleration sensor signal as a center;
   means for calculating the accumulated energy in said acceleration sensor signal on the basis of said filtered acceleration sensor signal, said change in said acceleration sensor signal, and said deviation in said acceleration sensor signal over time.

13. A processor as recited in claim 12, wherein said calculating means comprises:
   a rule memory for storing a plurality of fuzzy rules associated with said second and third group of membership functions;
   an input processor for determining a winning rule from said plurality of fuzzy rules on the basis of a fuzzified representation of said acceleration sensor signal; and
   an output processor for adjusting a value of said accumulated energy in accordance with said winning rule.

14. A processor as recited in claim 13, wherein each of said membership functions are constant-slope membership functions.

15. A processor as recited in claim 14, wherein said input processor calculates said fuzzified representation of said acceleration sensor signal on the basis of complemented distance values corresponding to each of said membership functions.

16. A processor as recited in claim 12, wherein each of said membership functions are constant-slope membership functions.

17. A processor as recited in claim 16, wherein said input processor calculates said fuzzified representation of said acceleration sensor signal on the basis of complemented distance values corresponding to each of said membership functions.

18. A processor as recited in claim 12, further comprising means for outputting an airbag trigger signal in response to a comparison between said accumulated energy and a left-exclusive membership function having said filtered acceleration sensor signal as an assigned center.

19. A method for detecting accumulated energy in response to an acceleration sensor signal, comprising the steps of:
   adjusting an average value signal corresponding to an average value of said acceleration sensor signal on the basis of a comparison between said acceleration sensor signal and a first group of membership functions each having a center corresponding to said average value signal;
   determining changes in said acceleration sensor signal based on a second group of membership functions having a time-delayed value of said acceleration sensor signal as an assigned center;
   determining deviations in said acceleration sensor signal from said average value signal on the basis of a third group of membership functions each having a center corresponding to said average value signal;
   determining a winning rule from a set of rules stored in a rule memory, each of said rules having rule terms corresponding to said second and third groups of membership functions, said winning rule being determined on the basis of a relational comparison between said set of rules and said changes and said deviations in said acceleration sensor signal;

dynamically adjusting an accumulated energy signal on the basis of said winning rule within a predetermined interval.

20. A method as recited in claim 19, further comprising the steps of:

decrementing said accumulated energy signal if said deviations and said time-delayed value of said acceleration sensor correspond to membership functions identifying zero changes; and outputting an impact detection signal if said accumulated energy signal reaches a level corresponding to said average value signal.

21. A method as recited in claim 20, wherein said membership functions are constant-slope membership functions.

22. A method as recited in claim 20, wherein said acceleration sensor signal represents acceleration of a vehicle, said impact detect signal corresponding to a crash detection, the method further comprising the step of supplying said impact detection signal to a crash-defensive system.

* * * * *